United States Patent [19]

Irie

[11] Patent Number: 4,578,023

[45] Date of Patent: Mar. 25, 1986

[54] APPARATUS FOR LOADING GREEN TIRES

[75] Inventor: Nobuhiko Irie, Nagasaki, Japan

[73] Assignee: Mitsubishi Jukogyo Kabushiki Kaisha, Tokyo, Japan

[21] Appl. No.: 757,867

[22] Filed: Jul. 23, 1985

Related U.S. Application Data

[62] Division of Ser. No. 512,129, Jul. 8, 1983.

[30] Foreign Application Priority Data

Jul. 23, 1982 [JP] Japan .................. 57-128363
Jul. 28, 1982 [JP] Japan .................. 57-131860

[51] Int. Cl.$^4$ .................................................. B29H 5/02
[52] U.S. Cl. .................................... 425/38; 425/34 R
[58] Field of Search .............. 425/32, 33, 38, 34 R

[56] References Cited

U.S. PATENT DOCUMENTS

| | | | |
|---|---|---|---|
| 1,326,874 | 12/1919 | MacBeth et al. | 425/38 |
| 1,931,638 | 10/1933 | Abbott | 425/33 |
| 3,167,810 | 2/1965 | Soderquist | 425/32 |
| 3,222,715 | 12/1965 | Harris | 425/32 |
| 3,267,515 | 8/1966 | Ulm | 425/38 X |
| 3,522,625 | 8/1970 | Ballè | 425/38 |
| 3,564,649 | 2/1971 | Soderquist | 425/38 X |
| 3,845,979 | 11/1974 | Schatz et al. | 425/38 X |
| 3,936,251 | 2/1976 | Balley | 425/38 |
| 4,197,065 | 4/1980 | DiRosa | 425/38 X |
| 4,391,769 | 7/1983 | Ichikawa et al. | 425/38 X |
| 4,452,577 | 6/1984 | Irie | 425/38 |

Primary Examiner—J. Howard Flint, Jr.
Attorney, Agent, or Firm—Wenderoth, Lind & Ponack

[57] ABSTRACT

An improved for loading green tires in a laterally aligned two chamber type tire curing press, in which green tire loading devices for the respective chambers are provided in a movable manner at a center portion of the tire curing press. A green tire placing table is provided in a movable manner at a position in front of the center portion of the tire curing press. Positions in front of the respective chambers of the tire curing press are used as standby positions of the green tire loading devices. A position in front of the center position of the tire curing press is used as a green tire supply position onto the green tire placing table. Delivery of a green tire is effected either by moving the green tire loading device to the green tire supply position or by moving the green tire placing table to the standby position and then inverting the green tire onto gripping claws of the loading device. Green tires can be thereby successively loaded into the respective chambers of the tire curing press.

15 Claims, 36 Drawing Figures

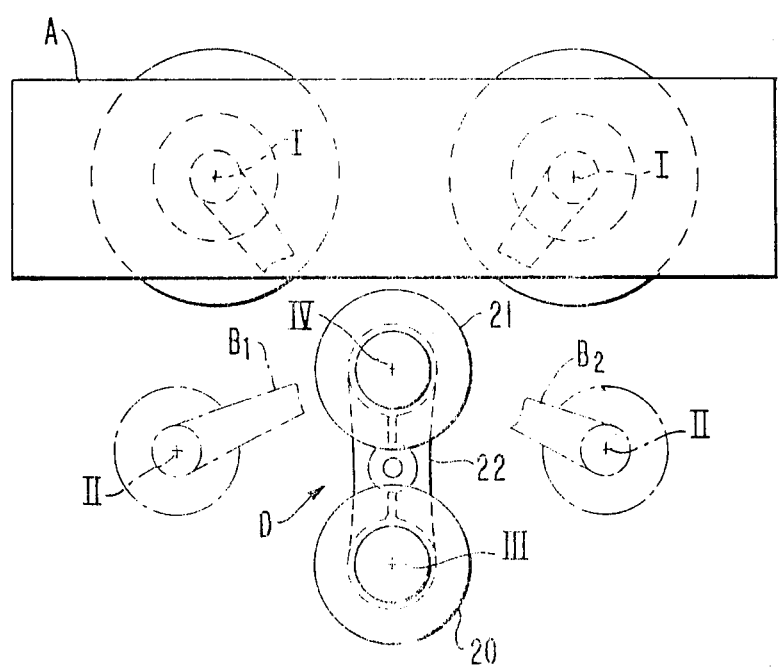

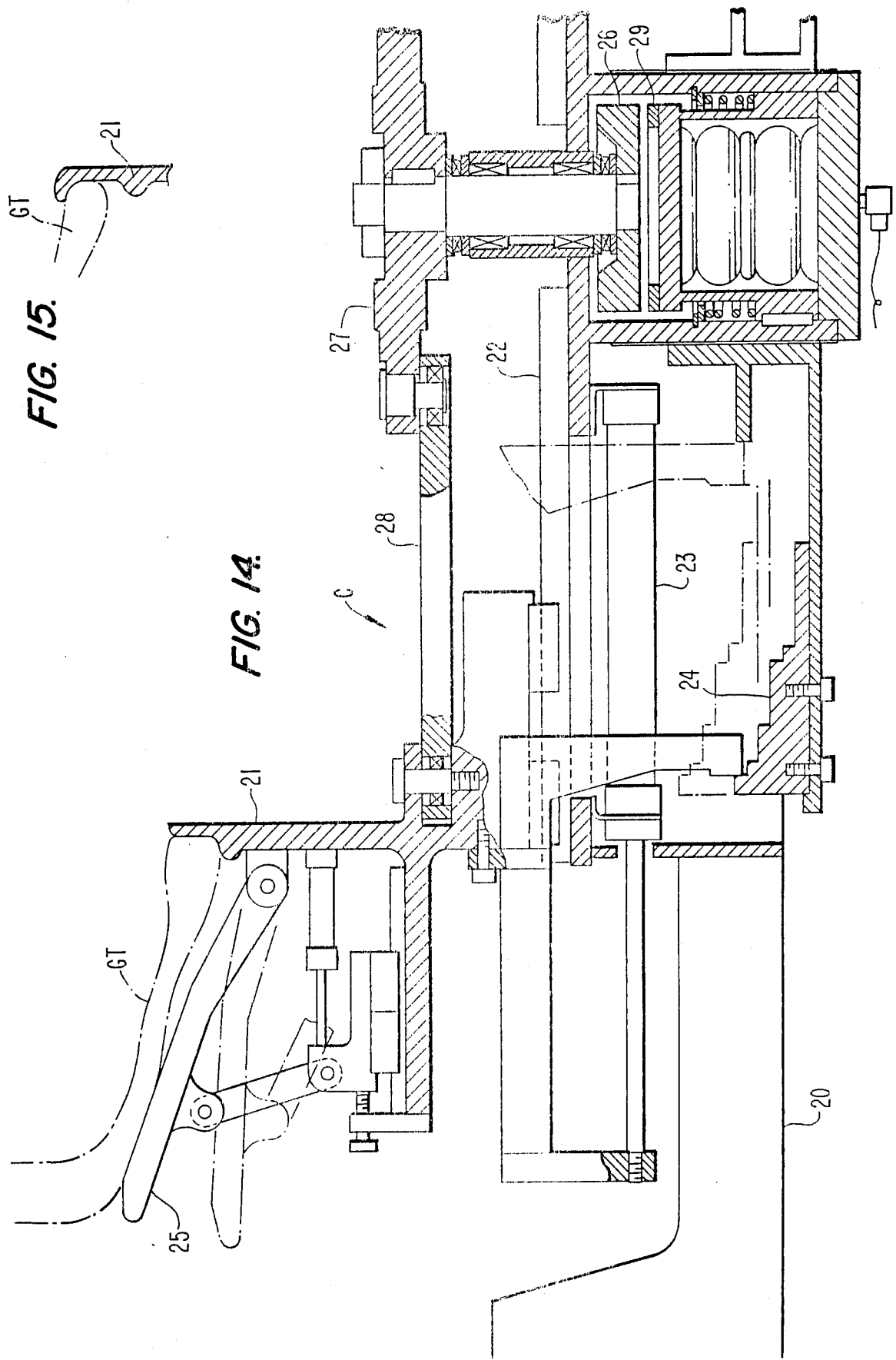

APPARATUS FOR LOADING GREEN TIRES

This application is a division of copending application Ser. No. 512,129, filed July 8, 1983.

BACKGROUND OF THE INVENTION

The present invention relates to an apparatus for loading green tires in a laterally aligned two chamber type tire curing press.

In FIG. 1 is shown one example of a green tire loading device in the prior art provided in a tire curing press A.

A green tire loading apparatus in the case of carrying out loading of green tires by making use of a combination of vertical movement and horizontal swinging motion of the green tires upon loading the green tires in the so-called two-chamber type tire curing press A in which two sets of metal tire molds are provided in one tire curing press so that two green tires can be simultaneously cured, comprises green tire loading devices $B_1$ and $B_2$ respectively on the opposite sides of the tire curing press.

The separate and individual provision of loading devices on the left and right sides as described above results in the following facts:

(1) There is a shortcoming that vertical drive sources and swing drive sources for the green tire loading devices $B_1$ and $B_2$ are provided separately and individually on the left the right sides and hence an installation cost is high.

(2) The green tire loading apparatus is necessitated not only to hold "green tires to be cured next" and stand by during the period when green tires are being cured in the tire curing press, but also to store "green tires to be cured next to the next" on tire placing tables during that period. In order to achieve this storage, the following two types were employed in the prior art.

The first type is the type in which green tire placing tables are fixedly disposed at positions II in front of the green tire curing press and green tires are stored on these green tire placing tables. In this case, the "green tires to be cured next" are gripped and suspended at green tire loading positions which are at an upper level at the positions II, and while these green tires are held at the upper level, the "green tires to be cured next to the next" are placed on green tire placing tables at a lower level at the positions II.

However, in the case of this type, since a sufficient vertical gap space for facilitating the placing work of a green tire is necessitated between the already gripped and suspended green tire and the green tire placing table, it is necessary to hold the already gripped green tire sufficiently high with respect to the green tire placing table.

On the other hand, in a curing press making use of only vertical movement which is recently believed favorable as a high precision tire curing press, since contrivance has been made to minimize the vertical stroke of the press for the purpose of improving productivity and maintaining a high precision for a long period, a vertical stroke of a green tire loading device is also made small, hence if the stroke necessitated for loading a green tire into the curing press is kept intact, then the sufficient vertical gap space for placing the "green tire to be cured next to the next" as described above cannot be reversed between the gripped and suspended "green tire to be cured next" on the green tire placing table, and therefore, it becomes necessary to give a surplus stroke to the green tire loading device for the aforementioned preparatory work and carry out complex vertical operations of the green tire loading device such that the loading device is raised up to a higher position for the purpose of the preparatory work, and after completion of the preparatory work the loading device is lowered to a lower position adapted for loading and is made to stand by.

In addition, since a curing press is constructed so as to be able to cure various sizes of green tires, the tire metal molds are replaced in accordance with the size of the tires to be produced. However, as the aforementioned green tire placing tables are disposed in front of the press, the green tire placing tables would hinder the replacement operation, and hence the green tire placing table is either removable or is of such a type that it can be swung to another position not hindering the operation only during the replacement operation.

Accordingly, the above-mentioned type of method for loading and storing green tires cannot be said to be suitable for a curing press which can achieve only vertical movement.

The second type is the type in which green tire placing tables are swingable forth and back between the positions II and the positions III shown in FIG. 1 for the purpose of eliminating the shortcomings of the above-described first type which are that:

(a) A large stroke is necessitated for the vertical movement of the green tire loading device.

(b) Control for the vertical movement of the green tire loading device is complex.

(c) Upon replacement of metal molds, there occurs a necessity for displacing the green tire placing tables to positions not hindering the displacement, through a special operation.

In the case of the second type, indeed the aforementioned shortcomings (a), (b) and (c) can be eliminated, but this type also has a shortcoming that it becomes necessary to drive the left and right green tire placing tables to swing, so that it is difficult to use the same drive source for both the left and right green tire placing tables, and hence the installation cost becomes high.

(3) Furthermore, if the preparatory work for green tires is carried out at the positions III, as will be appreciated from FIG. 1, a wide space for the curing press becomes necessary, and so, there occurs a disadvantage that in the case of linearly aligning ten and more curing presses in one line (as is quite generally practiced), a long space is necessitated.

(4) Moreover, since a curing press is perfectly automated from the loading of green tires up to the delivery of completed tires provided that green tires have been supplied onto the green tire placing tables, research and investigation for automatic supply and setting of green tires onto the green tire placing tables is being conducted. However, if the green tire placing tables are provided at the left and right end portions of a press as separated from each other as described above, such arrangement is not suitable for automatic setting of green tires supplied from an automatic supply apparatus. More particularly, in order for an automatic supply apparatus to stop at one position in front of the press and set green tires onto the respective green tire placing tables, the stop position must be sufficiently close to the respective green tire placing tables, but with the above-described loading apparatus, the stop position would be too far from the respective green tire placing tables, and as a result, it becomes necessary that the automatic supply apparatus should stop at the respective positions in front of each of the green tire placing tables, and because of such reasons, disadvantages would arise such as stopping of the apparatus twice for each press, complexity of control and loss of time.

On the other hand, the heretofore practiced method for loading a green tire into a curing press is the so-called "lower-bead-set-first" system in which a lower bead portion of a green tire is at first made to seat on a lower bead ring of a lower metal mold section. According to this method, as shown in FIG. 2, the green tire supported by a bladder expanded at an extremely low pressure is unstable, moreover even a quite small unevenness of the bladder would result in tilting of the green tire with respect to a center axis, and hence when it is tried to make an upper bead portion of the green tire to seat on the upper bead ring while bringing the upper bead ring close to the green tire, miss-seating would sometimes arise.

In order to obviate this shortcoming, it is desirable to carry out shaping of a green tire by making a bladder inflate within a green tire with its upper bead portion seated on an upper bead ring of an upper mold section and with its lower bead portion supported by a lower bead ring of a lower mold section as shown in FIG. 3. However, even if it is tried to carry out the shaping work illustrated in FIG. 3 by making the lower bead portion of the green tire seat on the lower bead ring while suspendingly gripping the upper bead portion of the green tire by means of a green tire loading device used in the prior art and, after the suspending grip by the aforementioned loading device has been released, by bringing the upper bead ring close to the green tire and making the upper bead of the green tire seat on the upper bead ring, the shaping work would fail.

More particularly, as soon as the suspending grip by the aforementioned loading device is released, the green tire would buckle as shown in FIG. 4.

In order to eliminate the above-mentioned shortcoming, the inventor of this invention has recently proposed a novel method disclosed in his U.S. Pat. No. 4,452,577, in which green tire grip claws of a green tire loading device are formed in an upwardly directed form (those used in the prior art were directed downwardly) so as to grip a lower bead portion of a green tire (in the prior art an upper bead portion was gripped), the respective ones of the aforementioned grip claws are associated with movable support claws for supporting a thread portion of a green tire from below and, thus a lower bead portion of a green tire is gripped and simultaneously its tread portion is supported from below at a position outside of a tire curing press. Under this condition the green tire is loaded into the press, the upper bead portion of the green tire is made to seat on an upper bead ring of an upper metal mold section, the seated bead portion of the green tire is suspendingly gripped by an upper bead gripping device of the upper metal mold section, and after the green tire has been lowered to make the lower bead portion of the green tire seat on the lower bead ring of the lower metal mold section, a bladder is inflated within the green tire as shown in FIG. 3.

According to this method, since the green tire is suspended at the portions above the center of gravity, it is also advantageous when the lower bead ring is made to enter into the lower bead of the green tire. However, when the green tire loading device receives a green tire at a position outside of the press, an operator must carry out the heavy tire to set it at the upwardly directed grip claws of the green tire loading device, and in the case where the weight of the green tire is approximately as heavy as 100 kg as is the case with a radial tire for use in trucks and buses, it becomes difficult for the operator to manually set the green tire. Nevertheless, if a modification is made such that a green tire on a green tire automatic delivery car is directly placed on the upwardly directed claws by means of an automatic setting device equipped on the automatic delivery car, then the number of green tires which can be preliminarily prepared for the next curing operation during the period when curing is being carried out in the curing press becomes two (in the case of a two-chamber type curing press), and hence a margin of only one cycle is maintained, so that in the event that a plurality of presses are installed, the aforementioned green tire automatic delivery and automatic setting apparatus must move around busily, and therefore, the number of presses which can be dealt with by means of one automatic delivery and setting apparatus as described above would be limited.

Therefore, the inventor of this invention proposed and disclosed in copending laid open Japanese patent application No. 54-9039 and U.S. Pat. No. 4,452,577 a method which makes it possible to prepare four green tires in front of a press by gripping an upper bead portion of a green tire placed on a green tire placing table with a green tire loading device, thereafter raising the green tire loading device up to an appropriate height, inverting the green tire loading device so as to make the green tire upside-down on the green tire loading device, and then loading the green tire into the press.

However, the proposed green tire loading device necessitates vertical movement, swinging movement for loading and further inverting movement, and hence it has a shortcoming that since the structure becomes complex and includes many movable portions, it is difficult to produce so as to operate with high precision.

OBJECTS AND SUMMARY OF THE INVENTION

The present invention has been proposed in view of the aforementioned background of the invention, and a principal object of the present invention resides in the following improvements in the loading of green tires into the respective left and right chambers of a two-chamber type tire curing press:

(1) Vertical reciprocating motion of at least the green tire loading devices for the respective left and right chambers is carried out by making use of the same vertical reciprocating track and the same vertical reciprocating driving devices for each, and thereby a lowering of the installation cost is achieved.

(2) Swinging motion of the green tire placing tables is carried out by making use of a simple driving device for the left and right ones, and thereby a further lowering of the installation cost is achieved.

(3) A curing press having a smaller overall width than the necessary space width for the curing press of the heretofore known type is formed, thus an installation space for the curing press and providing an economical curing press.

(4) A tire curing press favorable for a automatic green tire delivery and setting apparatus is formed. More particularly, when green tires are set on green tire placing tables by means of a green tire automatic delivery and setting apparatus, only one stop position in front of the press of the aforementioned automatic delivery and setting apparatus suffices for the desired operation.

(5) An improved green tire loading device is provided, in which inversion of tire by inverting a green the device is not employed but a green tire is inverted on a green tire holding and supplying device so that the green tire may be automatically set on upwardly directed claws of a green tire loading device, whereby movement of a green tire loading device is reduced to enhance precision, and also the labor of an operator is reduced, and furthermore a green tire loading device which is favorable for carrying out automatic setting of a green tire supplied from a green tire automatic delivery car, is provided.

According to one feature of the present invention, there is provided a method for loading green tires in a laterally aligned two-chamber type tire curing press, in which green tire loading devices for the respective chambers are provided in a movable manner at a center portion of the tire curing press, also a green tire placing table is provided in a movable manner at a position in front of the center portion of the tire curing press, positions in front of the respective chambers of the tire curing press are used as standby positions of said green tire loading devices, a position in front of the center portion of the tire curing press is used as a green tire supply position onto the green tire placing table, delivery of a green tire is effected either by moving the green tire loading device to the green tire supply position or by moving the green tire placing table to the standby position, and thereby green tires can be successively loaded into the respective chambers of the tire curing press.

According to another feature of the present invention, there is provided an apparatus for loading green tires in a laterally aligned two-chamber type tire curing press, in which a movable member that is vertically reciprocatable is provided on a center portion frame of the press, and a pair of left and right arms having green tire gripping devices at their one ends are provided on the movable member in a swingable manner.

According to still another feature of the present invention, there is provided an apparatus for loading green tires in a laterally aligned two chamber type tire curing press, in which a movable member that is vertically reciprocatable is provided on a center portion frame of the press, a pair of left and right arms having green tire gripping devices at their one ends are provided on the movable member in a swingable manner, and a green tire placing table having a pair of left and right set pedestals which are movable between a green tire supply position in front of a center portion of the press and another position or between the green tire supply position and loading standby positions in front of the respective laterally aligned chambers is provided at a position in front of the center portion of the press.

According to yet another feature of the present invention, there is provided an apparatus for loading green tires in a laterally aligned two-chamber type tire curing press, in which green tire loading devices are provided on a center portion frame of the press in a movable manner, a green tire gripping device in each of the tire loading devices is formed as a device for supporting a green tire by gripping a lower bead of the green tire, and a green tire hold and supply device having a green tire hold section which can be inverted and which is operable in such a manner that upon setting a green tire on the hold section the hold section receives the green tire so as to support a lower bead portion of the green tire and after inverting the hold section and the green tire the hold section supplies the green tire to the green tire holding device for the press, is provided at a position in front of the tire curing press.

BRIEF DESCRIPTION OF THE DRAWINGS

The above-mentioned and other features and objects of the present invention will become more apparent by reference to the following description of preferred embodiments of the invention taken in conjunction with the accompanying drawings, wherein:

FIGS. 6(a), 6(b) and 6(c) show a first preferred embodiment of a green tire loading apparatus according to the present invention, FIG. 6(a) being a front view, FIG. 6(b) being an enlarged partial cross-sectional view encircled by a chain line b in FIG. 6(a), and FIG. 6(c) being a partial transverse cross-section view as viewed in the direction of an arrow c in FIG. 6(b), FIGS. 7(a), 7(b) and 7(c) show one preferred embodiment of a mount portion between a loading device and a press frame in a green tire loading apparatus according to the present invention, FIG. 7(a) being a partial front view, FIG. 7(b) being a plan view of the portion shown in FIG. 7(a), and FIG. 7(c) being a cross-sectional view taken along line c—c in FIG. 7(a), FIGS. 8(a) and 8(b) show a first preferred embodiment of a green tire placing table according to the present invention, FIG. 8(a) being a plan view to be used for explaining the operation of the green tire loading apparatus, and FIG. 8(b) being a side view partly in cross section showing a more detailed structure of the green tire placing table, FIGS. 11 through 18 show another preferred embodiment of the present invention, FIG. 11 being a general plan view, FIG. 12 being a side view as viewed from the left in FIG. 11, FIG. 13 being a front view of green tire loading devices, FIG. 14 being an enlarged cross-sectional view showing a principal part of a green tire gripping device, FIG. 15 being a partial cross-sectional view showing one example of a modification of the grip claws in FIG. 14, FIG. 16 being a plan view partially in cross section of a green tire hold and supply device, FIG. 17 being a front view partly in cross section of the green tire hold and supply device shown in FIG. 16, and FIG. 18 being a partial side view partly in cross section of the device shown in FIG. 16, FIGS. 19 through 23 show still another preferred embodiment of the present invention, FIG. 19 being a general plan view, FIG. 20 being a partial side view of the apparatus in FIG. 19, FIG. 21 being a plan view of a green tire hold and supply device, FIG. 22 being a front view of the structure shown in FIG. 21, and FIG. 23 being a side view as viewed from the left in FIG. 22, and FIGS. 24 through 28 show yet another preferred embodiment of the present invention, FIG. 24 being a general plan view, FIG. 25 being a partial side view of the apparatus shown in FIG. 24, FIG. 26 being a plan view of a green tire holding device, FIG. 27 being a front view of the device shown in FIG. 26, and FIG. 28 being a side view as viewed from the left in FIG. 27.

DETAILED DESCRIPTION OF THE PREFERRED EMBODIMENTS

Figure 5:
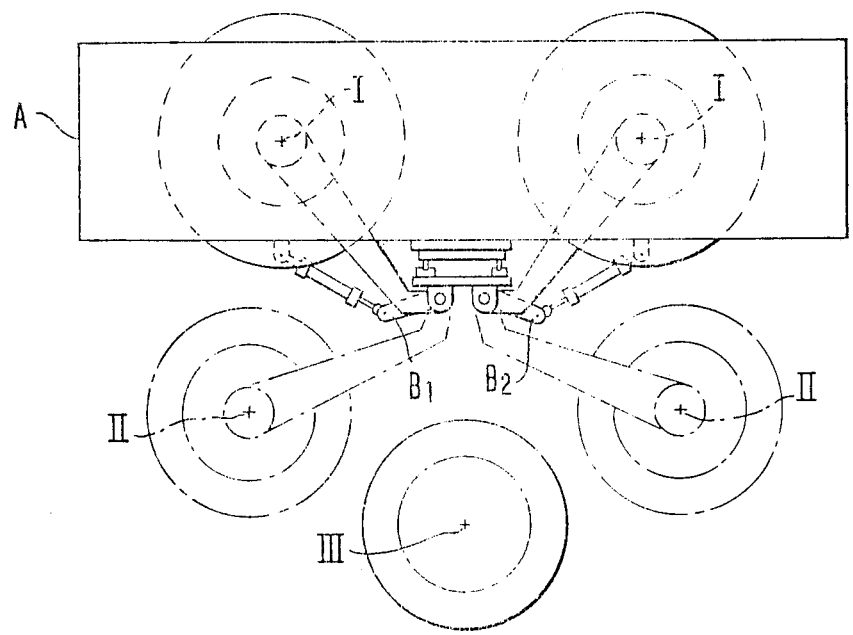
FIG. 5 is a plan view of a curing press and a green tire loading device showing one preferred embodiment of the present invention.

In FIG. 5, reference character A designates a two-chamber type tire curing press, reference character $B_1$ and $B_2$ designate devices provided on a center frame of the tire curing press for loading green tires to the respective left and right chambers, and these green tire loading devices $B_1$ and $B_2$ are vertically reciprocatable and also horizontally swingable either between positions I which are centers of the metal molds of the press and positions II which are standby positions in front of the metal molds, or between the aforementioned positions I and a position III which is a green tire supply position via the aforementioned positions II, respectively.

Figure 6A:
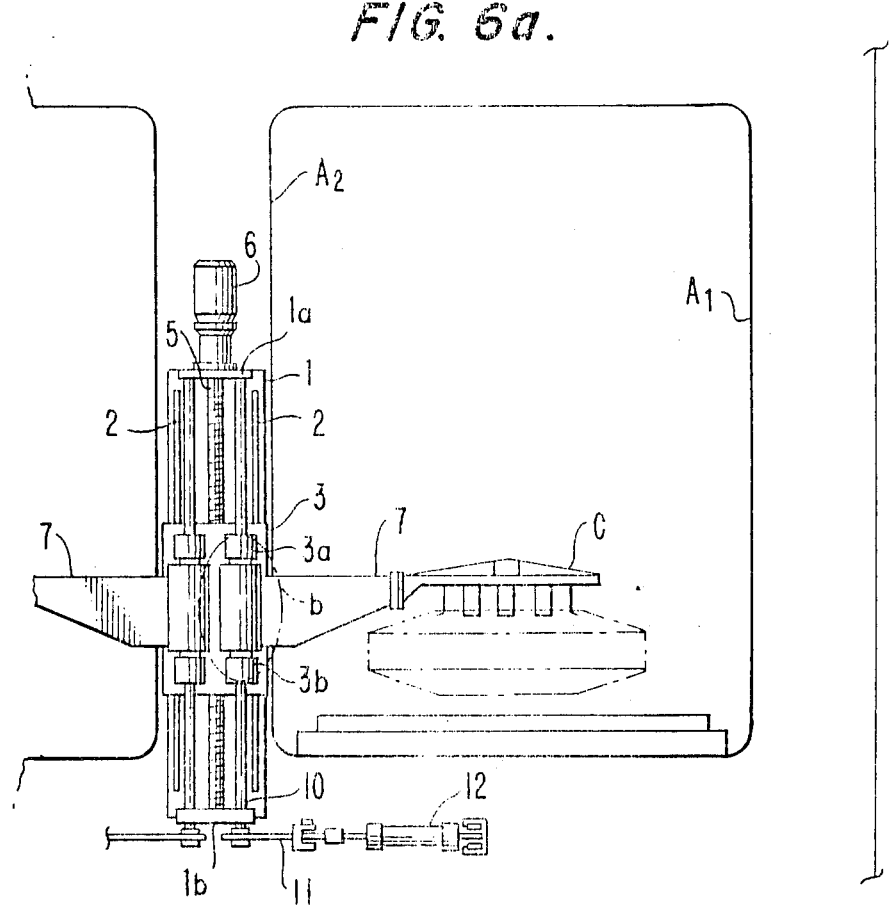

FIGS. 6(a), 6(b) and 6(c) shows a detailed structure of the above-mentioned green tire loading devices in which, reference character $A_1$ designates a side frame in the right side portion of a laterally aligned two-chamber type tire curing press of a single movement type employing only a vertical movement, and in this figure are illustrated green tire loading devices equipped in a tire curing press of the type provided with a center frame $A_2$ at a center portion between the respective left and right chambers.

Reference numeral 1 designates a common base plate mounted on the center frame $A_2$, and this base plate 1 is provided with brackets 1a and 1b at its top and bottom portions.

Onto the base plate 1 are fixedly secured linear tracks 2 normally called "linear motion bearings", which are disposed in parallel to center axes (vertical axes) of the press metal molds. With the same tracks 2 are engaged known bearing nuts not shown, and a truck 3 is fixedly secured to these bearing nuts. In the illustrated embodiment, it is assumed that two sets of bearing nuts are provided for the respective left and right tracks. A nut not shown is fixedly secured to the truck 3 at its appropriate position, a screw rod 5 engaged with that nut is rotatably mounted between the brackets 1a and 1b, and an output shaft of a rotary driving device 6 is connected to one end of the screw rod 5 projecting from the bracket 1a. It is to be noted that the driving device 6 is fixedly mounted on the bracket 1a.

The truck 3 is provided with brackets 3a and 3b, and each pair of the brackets 3a and 3b rotatably support an arm 7 provided with a known green tire gripping device C as illustrated in FIG. 6(a).

FIG. 6(b) shows the rotatable support structure in the state where the truck 3 is located at the lower limit position. The above-mentioned arm 7 has its boss portion 7a at its base end rotatably supported with respect to the above-referred to brackets 3a and 3b by the intermediary of bearings 8, and these bearings 8 are mounted in the brackets 3a and 3b, respectively, so that the arm 7 may not move in the vertical direction.

In addition, within the boss portion 7a is fixedly secured a bush 9 by a known method so that it cannot rotate relative to the arm 7, and this bush 9 has a square hole as shown in FIG. 6(c). A square rod 10 is provided which engages with the square hole so as to be slidable relative to the square hole. The opposite ends of the square rod 10 are rotatably supported by the brackets 1a and 1b, and at an end portion of the square rod 10 projecting downwardly from the bracket 1b is fixedly mounted an arm 11.

To the arm 11 is pivotably coupled an end of a rod of a cylinder 12 having its one end pivotably mounted to the press frame.

According to the above-mentioned structure, the truck 3 can be arbitrarily moved up and down or stopped in the vertical directions by means of the driving device 6, and regardless of the position of the truck 3, the left and right arms 7 can be individually swung by means of the cylinders 12. In other words, since both the left and right green tire loading devices can be vertically elevated or lowered by means of a single driving device, the apparatus is economical, and moreover, since the swing driving device (the cylinders 12 in the illustrated embodiment) is provided on the side of the press frame, there is no need to move up and down the pipings for the cylinders 12 in accordance with elevation and fall of the green tire loading devices, and so, troubles such as damage of piping hoses or the like can be prevented.

In this preferred embodiment, the cylinder 12 operates so as to achieve three-position control of the loading device for the positions I, II and III shown in FIG. 5 when a first method for loading green tires as will be described later is employed, but it operates so as to achieve two-position control of the loading device for the positions I and II shown in FIG. 5 when a second method for loading green tires as will be described later is employed.

FIGS. 7(a)–7(c) are schematic views to be used for explaining the method for mounting the common base plate 1 to the press frame $A_2$, in which although various elements are associated with the common base plate 1 as shown in FIGS. 6(a)–6(c), only the base plate 1 is illustrated with these various elements omitted. The bottom end of the common base plate 1 is connected to an appropriate position of the center frame $A_2$ by means of a pin 13, and the pin 13 is fixedly secured to the press frame $A_2$. In addition, the top end of the common base plate 1 is fitted in a bracket 14 having a T-shaped groove 14a, and the bracket 14 is fixedly mounted at an appropriate position of the center frame $A_2$.

Accordingly, when the center frame $A_2$ extends or contracts, the base plate 1 can slide at the portion of the bracket 14, and hence a force caused by extension and contraction would not be generated.

This feature provides a novel method for mounting green tire loading devices when the loading devices are to be mounted on a longitudinal frame in a tire curing press having a gate-shaped frame of the type such that a reaction force of pressing in a press may act upon the longitudinal frame. More particularly, in the case of the aforementioned type of tire curing press, a strain would be generated in the longitudinal frame in association with generation of a pressing force, the longitudinal expansion of the frame is produced in the magnitude of several mm, and if the pressing force is released, this extension of the longitudinal frame is reduced and the frame is restored to the original state. If the base plate of the green tire loading devices or the like is fixedly secured as by bolts to such a longitudinal frame which repeats expansion and contraction, then a large force would be exerted upon these bolts upon pressing, and as the press is operated repeatedly, undesirable situations such as loosening of coupling portions or breaking of bolts would result. Accordingly, the present invention is effective to provide a green tire loading apparatus having a long life, in that upon mounting green tire loading devices on a press frame which repeats extension and contraction due to a pressing force, generation of excessive forces at mount portions can be prevented by mounting one end of a base plate of green tire loading devices on a press frame in an unconstrained state with respect to the direction of extension of the press frame.

The aforementioned structure relating to a coupling portion is not limited to the press of the type in which green tire loading devices are disposed at the center portion of the press, but in the press of the type in which green tire loading devices are disposed at the left and right side positions of the press also, as a matter of course, the structure is applicable to the case where a base plate of green tire loading devices is mounted on a press frame which repeats extension and contraction.

Now a first preferred embodiment of a green tire placing table D for supplying a green tire will be described with reference to FIGS. 8(a) and 8(b).

Figure 8B:
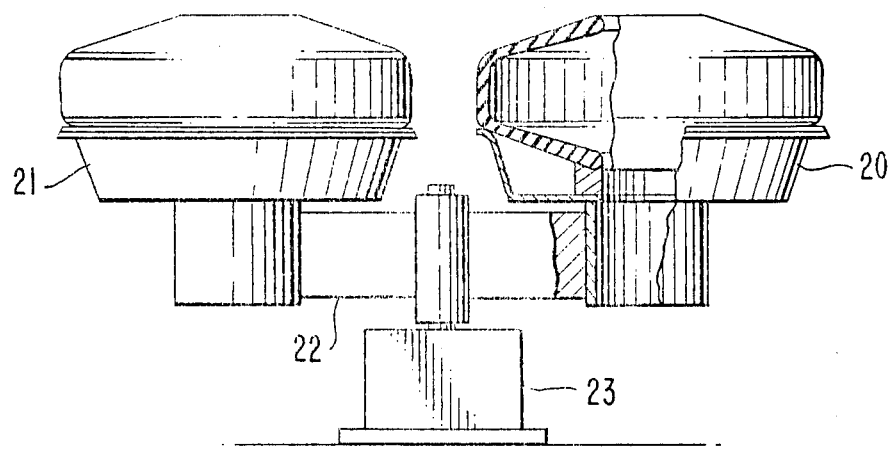

As shown in FIGS. 8(a) and 8(b), a pair of left and right set pedestals 20 and 21 are mounted on the same arm 22, which arm is disposed on a floor surface in front of a center portion of a press and rotatably mounted on a stand 23 including a known rotating mechanism not shown.

In the case where this green tire placing table D is used in a first loading method as will be described later, the radius of rotation and the coordinate (relative to the press) of the center of rotation of the arm 22 are designed so that when the green tire loading device $B_1$ has come to the position II, the center of the set pedestal 20 may come to the position III, and when the green tire loading device $B_2$ has come to the position II, the center of the set pedestal 21 (which is at the position IV when the set pedestal 20 is at the position III) may be turned by 180° to be brought to the position III.

Alternatively, in the case the green tire placing table D is used in a second loading method as will be described later, the radius of rotation and the coordinate of the center of rotation of the arm 22 are designed so that when the respective green tire loading devices $B_1$ and $B_2$ are disposed at the respective positions II and the green tire placing table D has been rotated by 90° from the state shown in FIG. 8(a), the centers III and IV of the respective set pedestals 20 and 21 may coincide with the positions II of the respective green tire loading devices $B_1$ and $B_2$.

In the event that the above-described green tire placing table D is used in the first green tire loading method as will be described later, the distance of the set pedestal 20 or 21 from the center of the press when the set pedestal 20 or 21 is placed at the position III can be shortened, but it becomes necessary to make the position control for the green tire loading devices $B_1$ and $B_2$ 3-position control.

On the other hand, in the event that the green tire placing table D is used in the second green tire loading method, while the green tire loading devices $B_1$ and $B_2$ necessitate only 2-position control, it becomes necessary to shift the center of rotation of the green tire placing table D to a further forward position in front of the press as compared to the position in the case of the first method shown in FIG. 8(a), and also either to make the radius of rotation of the green tire placing table D a little larger than that in the case of the first method or to shift the positions II of the respective green tire loading devices $B_1$ and $B_2$ closer to the position III, and therefore, the necessary space in front of the press becomes a little larger.

Figure 9A:
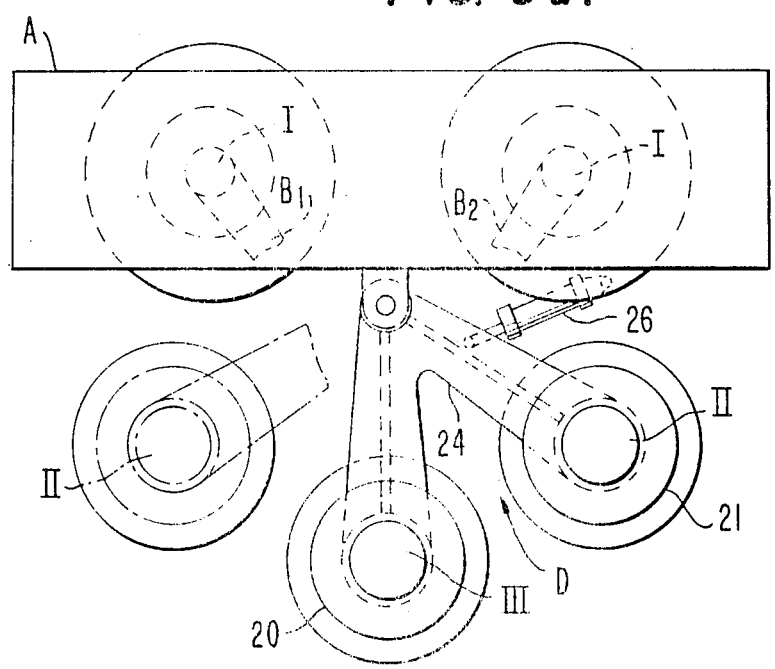
FIGS. 9(a) and 9(b) show a second preferred embodiment of a green tire placing table according to the present invention, FIG. 9(a) being a plan view to be used for explaining the operation of the green tire loading apparatus, and FIG. 9(b) being a side view partly in cross-section showing a more detailed structure of the green tire placing table.
Figure 9B:
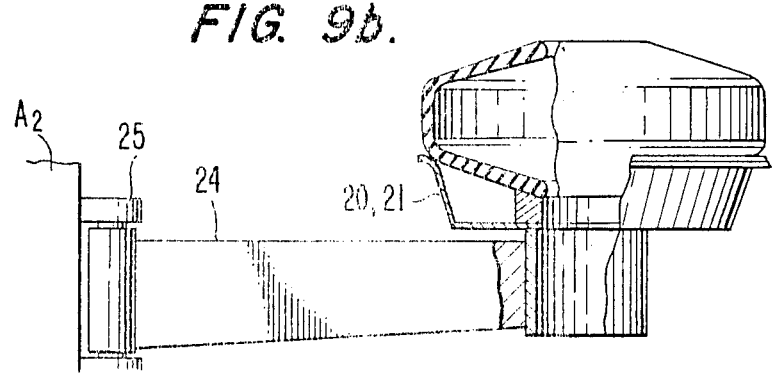

A green tire placing table D shown in FIGS. 9(a) and 9(b) can provide a further improved green tire placing table, which necessitates only 2-position control for the position control of the green tire loading devices $B_1$ and $B_2$ and which can make the space in front of the press necessitated for the green tire placing table D identical either in the case of the first loading method or in the case of the second loading method. In the green tire placing table D, two green tire set pedestals 20 and 21 are mounted on the tip ends of respective branches of a forked arm 24, and this forked arm 24 is rotatably supported from brackets 25 at the lower portion on the front surface of the press frame $A_2$. In addition, at an appropriate position of the arm 24 is mounted a cylinder 26 having its one end pivotably mounted to the press frame $A_2$ and an end of its rod pivotably mounted to the arm 24. When the set pedestal 20 is placed at the position III, the other set pedestal 21 is brought to a lower position vertically aligned with the position II of the right side green tire loading device $B_2$, and when the cylinder 26 is extended, resulting in rotation of the forked arm 24, and the set pedestal 20 is brought to a lower position vertically aligned with the position II of the left side green tire loading device $B_1$, the set pedestal 21 would occupy the position III.

Figure 10A:
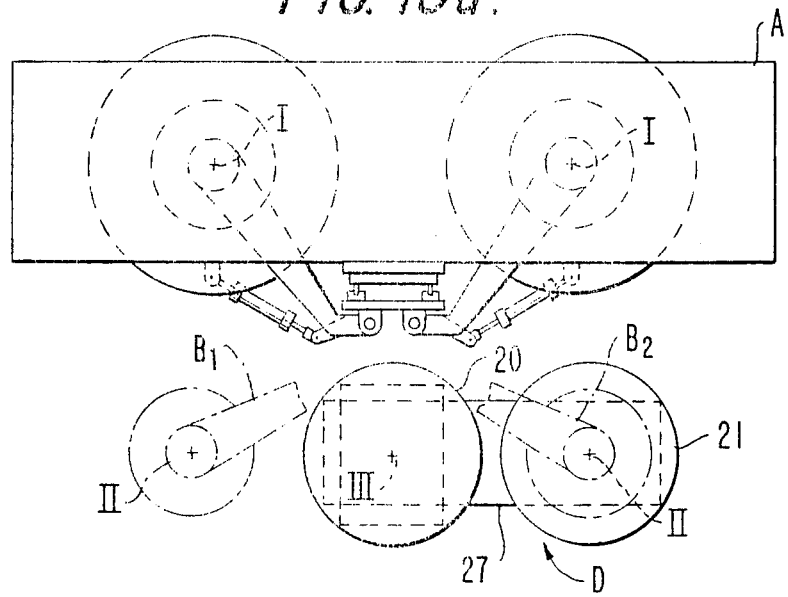
FIGS. 10(a), 10(b) and 10(c) show a third preferred embodiment of a green tire placing table according to the present invention, FIG. 10(a) being a plan view to be used for explaining the operation of the green tire loading apparatus, FIG. 10(b) being a front view showing a more detailed structure of the green tire placing table, and FIG. 10(c) being a side view of the same.
Figure 10B:
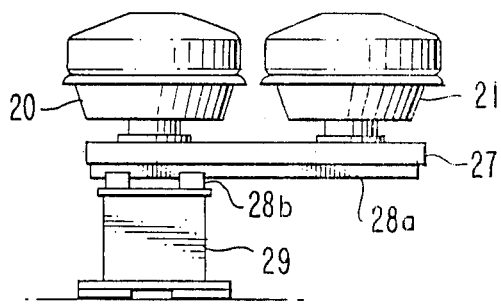
Figure 10C:
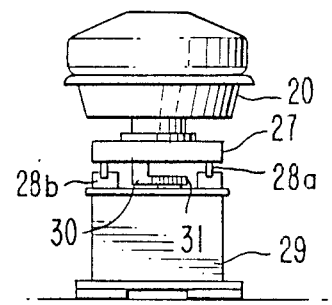

Furthermore, a green tire placing table D shown in FIGS. 10(a)–10(c) is designed so as to further reduce the necessary space in front of the press as compared to the green tire placing table D shown in FIGS. 9(a) and 9(b).

As shown in FIGS. 10(a)–10(c), set pedestals 20 and 21 are mounted on the same table 27, linear tracks 28a normally called "linear motion bearings" are fixedly secured to the lower surface of this table 27, bearing nuts 28b to be engaged with these linear tracks 28a are fixedly secured to the top surface of a stand 29 fixedly mounted on the floor in front of the press, a rack gear 30 is fixedly provided at an appropriate position on the bottom surface of the table 27 in parallel to the tracks 28a, and a pinion gear 31 to be meshed with the rack gear 30 is mounted to an output shaft of a rotary driving device fixedly disposed in the stand 29. The stand 29 and the tracks 28a are disposed so that the line connecting the centers of the green tire set pedestals 20 and 21 on the table may become parallel to the line connecting the centers of the respective chambers of the press, the line connecting the centers of the positions II of the green tire loading devices $B_1$ and $B_2$ is aligned with the line connecting the centers of the green tire set pedestals 20 and 21, and the distance between the centers of the green tire set pedestals is chosen to be equal to ½ of the centers of the green tire loading devices at the positions II. In addition, the limits of movement in the left and right directions of the table 27 driven by the rotary driving device in the stand 29 are adjusted in the following manner. That is, when the table 27 has moved up to the left limit position, the center of the set pedestal 20 coincides with the center of the loading device $B_1$ (the position II) and the center of the set pedestal 21 coincides with the center of the position III, and when the table 27 has moved up to the right limit position, the center of the set pedestal 20 coincides with the center of the position III and the center of the set pedestal 21 coincides with the center of the loading device $B_2$ (the position II). Accordingly, green tires can be successively supplied to the respective set pedestals at the position III, and the supplied green tires can be delivered to the respective green tire loading devices $B_1$ and $B_2$ at their respective positions II. Therefore, the green tire loading devices $B_1$ and $B_2$ necessitate only 2-position control at the positions I and the positions II, and moreover, it will be appreciated that the necessary space in front of the press can be made smaller than any one of the above-mentioned cases.

In addition, it will be understood that upon replacement of metal molds, in any one of the above-mentioned cases the green tire placing table D would not hinder the replacement work for the metal molds. More particularly, in the case of the embodiment shown in FIGS. 8(a) and 8(b) the green tire placing table D is only necessitated to be placed at right angles to the tire curing press, in the case of the embodiment shown in FIGS. 9(a) and 9(b) it is only necessitated to place the green tire placing table D as shown in FIG. 9(a) when replacement of the left side metal mold is to be carried out and to reverse the position upon replacement of the right side metal mold, and in the case of the embodiment shown in FIGS. 10(a)–10(c) it is only necessitated to place the green tire placing table D as shown in FIG. 10(a) upon replacement of the left side metal mold and to reverse the position upon replacement of the right side metal mold.

Now detailed description will be made on the first green tire loading method in which green tires are loaded into a tire curing press by means of the green tire loading devices shown in FIGS. 6(a)–6(c) and the green tire placing table shown in FIGS. 8(a) and 8(b).

It is to be noted that in the following explanation the clockwise rotation of a green tire placing table is called "positive rotation" and vice versa.

(1) The green tire loading devices $B_1$ and $B_2$ are placed at the positions II, and the tire curing press starts a predetermined curing process.

(2) In response to a signal transmitted from the curing press, a green tire delivery car stops in front of the press, and either an operator manually sets or the delivery car automatically sets a green tire on the set pedestal 20. At this moment, the set pedestal 20 is disposed at the position III in FIG. 8(a).

(3) The green tire loading device $B_1$ moves from the position II to the position III, then it descends, and after it has gripped the green tire on the set pedestal 20 it rises.

(4) A green tire is again set on the set pedestal 20 through the same process as that described in the step (2) above.

(5) The green tire loading device $B_2$ is moved to the position III, then it descends, and after it has gripped the green tire it rises and is returned to the position II.

(6) Thereafter, a next green tire is set on the set pedestal 20. Then the green tire placing table D is subjected to positive rotation of 180° so as to bring the set pedestal 21 to the position III where it receives a next to the next green tire.

Through the aforementioned procedures, two green tires are prepared on the loading devices $B_1$ and $B_2$, and separate two green tires are prepared on the set pedestals 20 and 21, respectively.

(7) A curing process is finished and then the green tires gripped by the loading devices $B_1$ and $B_2$ are loaded into the press and are set at the center of the metal molds by well-known means.

(8) The green tire loading devices $B_1$ and $B_2$ are returned to the positions II, and the press enters a curing process.

(9) At an appropriate time during the curing process, the loading device $B_1$ is brought to the position III, and after it has received the green tire set on the set pedestal 21 it is returned to the position II.

(10) Meanwhile, the tire placing table D is subjected to negative rotation by 180°, and hence the set pedestal 20 is brought to the position III. Then the loading device $B_2$ is brought to the position III, and after it has received the green tire set on the set pedestal 20 it is returned to the position II.

(11) When the green tire delivery car has arrived at the curing press, it sets a next green tire on the set pedestal 20, then the green tire placing table D is subjected to positive rotation by 180° to bring the set pedestal 21 to the position III, and a next to the next green tire is set on the set pedestal 21.

From the above description, one will understand the mode of operation in which among the four green tires prepared in the steps (1) to (6) above, two green tires are consumed in the step (7) above, the green tires on the set pedestals are transferred to the loading devices $B_1$ and $B_2$ in the steps (8) and (9) above, two green tires are supplemented onto the vacant set pedestals 20 and 21 in the steps (10) and (11) above, and thereby four green tires are again prepared.

The above-mentioned is a first green tire loading method, and it can be replaced by a second green tire loading method as will be described hereunder.

(1) The same step as the step (1) in the first method.

(2) The same step as the step (2) in the first method.

(3) The green tire placing table D is subjected to positive rotation by 90° and hence the set pedestal 20 is brought to the position II of the loading device $B_1$. Thereupon, the loading device $B_1$ descends to receive the green tire on the set pedestal 20, and then it rises.

(4) While the loading device $B_1$ is rising, the green tire placing table D is subjected to positive rotation by 90°, to bring the set pedestal 20 to the position IV and the set pedestal 21 to the position III, and a next green tire is set on the set pedestal 21.

(5) The green tire placing table D is subjected to negative rotation by 90° on the contrary to the preceding step so as to bring the set pedestal 21 to the position II of the loading device $B_2$, where the green tires is supplied to the loading device $B_2$, and then the loading device $B_2$ rises.

(6) While the loading device $B_2$ is rising, the green tire placing table D is further subjected to negative rotation by 90° to bring the set pedestal 21 to the position IV and the set pedestal 20 to the position III where the latter pedestal receives a next green tire, and then the green tire placing table D is subjected to positive rotation of 180° whereby the set pedestal 21 is brought to the position III, and the set pedestal 21 receives a next green tire.

Through the aforementioned procedures, two green tires would be prepared on the loading devices $B_1$ and $B_2$, respectively, and additional two green tires would be prepared on the set pedestals 20 and 21, respectively.

(7) The same step as the step (7) in the first method.

(8) The same step as the step (8) in the second method.

(9) At an appropriate time during the curing process, the green tire placing table D is subjected to negative rotation by 90°, and hence the respective set pedestals 20 and 21 are brought to the positions II of the loading devices $B_1$ and $B_2$.

(10) The loading devices $B_1$ and $B_2$ descend, and after they have received the green tires on the respective set pedestals 20 and 21, they rise.

(11) When the green tire delivery car has arrived at the press for conveying green tires, the green tire placing table D is subjected to negative rotation by 90° so as to bring the set pedestal 20 to the position III where it receives a next green tire.

(12) The green tire placing table D is subjected to positive rotation by 180° so as bring the set pedestal 21 to the position III where it receives a next green tire.

From the above description, one will understand the mode of operation in which among the four green tires prepared in the steps (1) to (6) above, two green tires are consumed in the step (7) above, the green tires on the respective set pedestals are transferred to the loading devices $B_1$ and $B_2$, respectively, in the steps (8) to (10), two green tires are supplemented onto the vacant set pedestals 20 and 21 in the steps (11) and (12) above, and thereby four green tires are again prepared.

In addition, while the described first method and second method have been explained as making use of a combination of the green tire loading devices shown in FIGS. 6(a)-6(c) and the green tire placing table shown in FIGS. 8(a) and 8(b), the procedures in the case of practicing the above described second method by making use of the above-described green tire loading devices and the green tire placing table shown in FIGS. 9(a) and 9(b), and in the case of practicing the above described second method by making use of the above-described green tire loading devices and the green tire placing table shown in FIGS. 10(a)-10(c), will be readily understood without necessitating further explanation, and therefore, further description thereof will be omitted.

Also, it will be seen from the above description that the advantages as described in the following can be obtained:

(1) Green tires can be prepared at maximum four during a curing process in a curing press, and the green tire loading apparatus does not hinder full automatic operation of the curing press.

(2) The green tire loading devices $B_1$ and $B_2$ can be raised and lowered by means of the same elevation and fall driving device, and hence an economical green tire loading apparatus can be provided.

(3) Since two green tire set pedestals 20 and 21 can be moved by means of the same driving device, an economical green tire placing table can be provided.

(4) Since setting of a green tire on a green tire set pedestal is carried out at one location in a center portion of a press, the green tire loading apparatus is favorable for automatic delivery and setting of green tires.

(5) Since the supplementing of green tires is effected at a position beneath a gripped and suspended green tire, an elevating stroke of a green tire loading device can be made small, and so, an economical green tire loading apparatus can be provided.

(6) Since green tire loading devices and a green tire placing table are disposed in a center portion of a press, the overall width of the press can be made narrower than the case of the press of the left-right separated type, and hence a small installation space will suffice.

(7) Since any obstacle can be eliminated from the front side portion of a press upon replacement of metal molds, replacement can be achieved in a highly efficient manner.

(8) Since a driving source for swing motion of the green tire loading devices is disposed on the side of the press frame, there is no need to move the wiring or piping for the swing driving device in accordance with rise and fall of the green tire loading devices, and so, the green tire loading apparatus is excellent in durability and safety.

(9) Since the mounting portion of the base plate of the green tire loading devices for mounting to the press frame is movable, even if the press frame extends or contracts, an excessive force would not be generated at the mounting portion, and hence it would not occur that the precision of the green tire loading apparatus is degraded or the apparatus is damaged.

Figure 11:
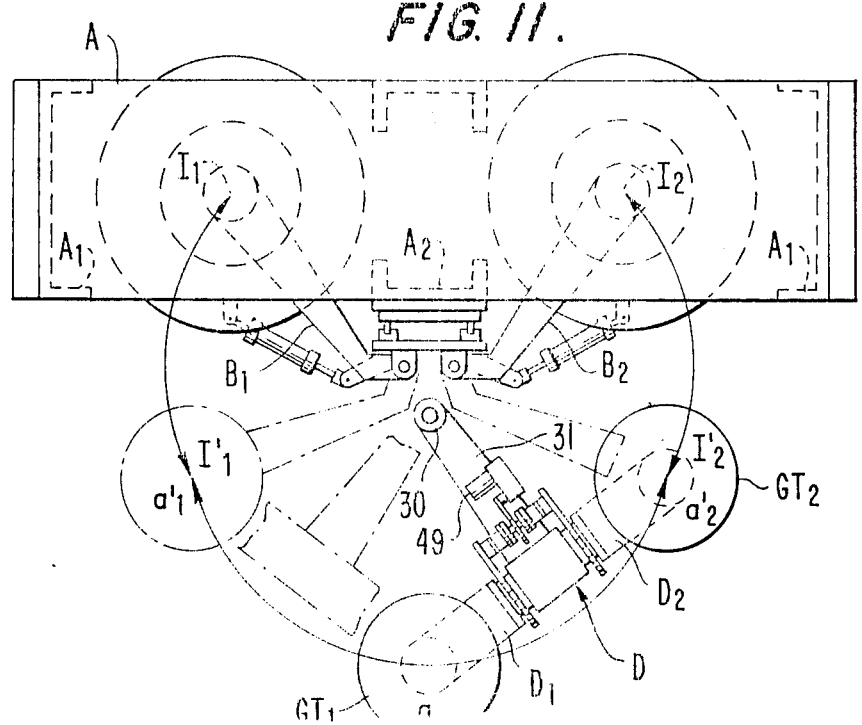
Figure 12:
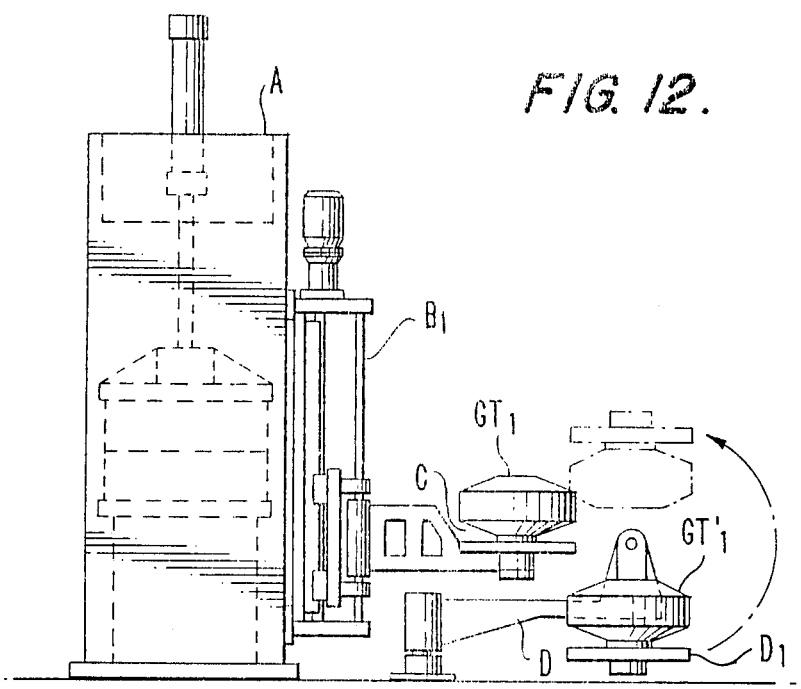
Figure 13:
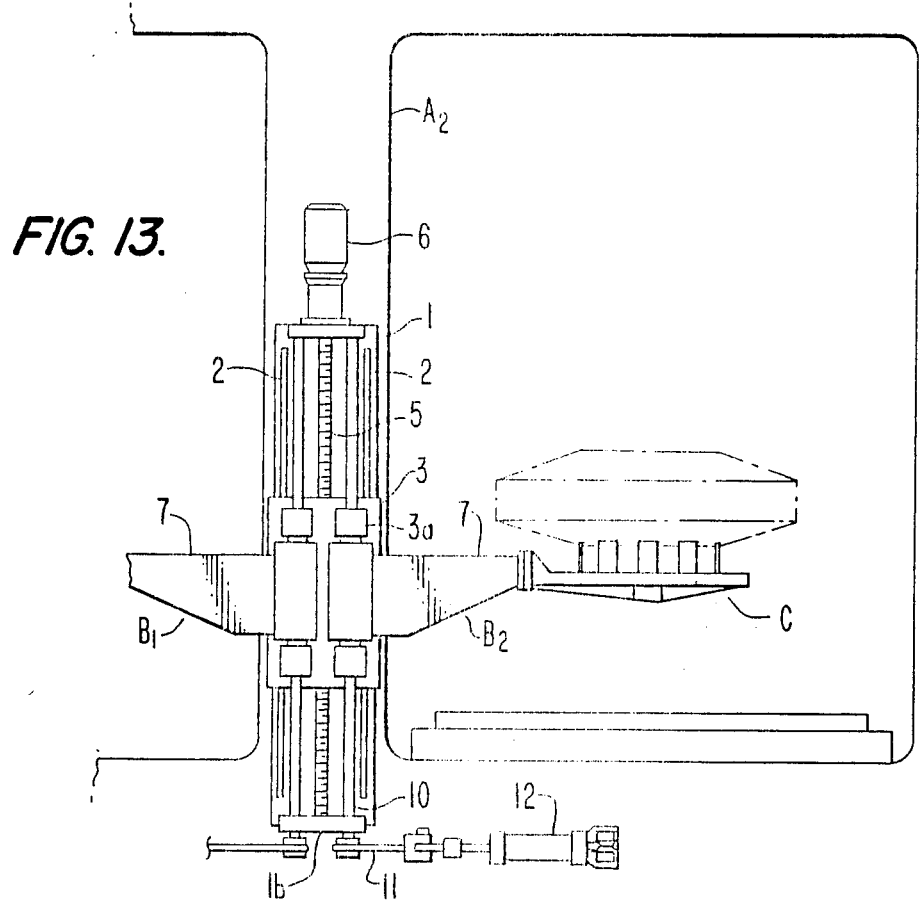

Now description will be made on another preferred embodiment of the present invention illustrated in FIGS. 11 to 18. FIGS. 11 and 12 are schematic views showing relationships among a tire curing press A, green tire loading devices $B_1$ and $B_2$ provided in a center portion of the press A and a green tire holding and supplying device D provided at a position in front of the press A. Twin green tire holding devices $D_1$ and $D_2$ are formed on the green tire holding and supplying device D to be able to swing in a portion in front of the center of the press A, so that when one of the green tire holding devices is at point a in the portion in front of the center of the press, the other green tire holding device is adapted to coincide with a standby position of the green tire loading device outside of the press. In addition, the respective green tire holding devices $D_1$ and $D_2$ are formed to be able to be inverted individually or simultaneously.

The above-referred to tire curing press A is a two-chamber type press of a single movement type which achieves only vertical movement, and it is of such a type that includes side frames $A_1$ and a center portion frame $A_2$ between the left and right chambers. The green tire loading devices $B_1$ and $B_2$ are mounted on this center frame $A_2$. As will be obvious from FIG. 13, these green tire loading devices $B_1$ and $B_2$ have the same structure as those illustrated in FIG. 6, except for the green tire gripping device C, and therefore, detailed description thereof will be omitted.

For the green tire gripping device C mounted on each of the green tire loading devices $B_1$ and $B_2$, a device as shown in FIGS. 14 and 15 is employed. This tire gripping device C was invented by the inventor of this invention and is disclosed in copending laid open Japanese patent application No. 59-9038 and U.S. Pat. No. 4,452,577, and it has an arm 20 which is in turn fixedly secured to an arm 7 of the green tire loading device $B_1$ or $B_2$. In FIG. 14 is shown only a left half of the green tire gripping device C, and only one of gripping claws 21 which are provided in multiple, is illustrated. The gripping claw 21 has the illustrated configuration which is favorable for supporting a lower bead portion of a green tire from below when the gripping claws 21 receive a green tire GT. The gripping claws 21 are moved along tracks 22 for linear motion devices, which are disposed radially from the center and normally called linear motion bearings, by the action of cylinders 23, and the limit of movement is defined by abutment against a selected stopper 24 as shown in FIG. 14, so that an excessive force is prevented from acting upon the bead portion of the green tire. For all the gripping claws 21 or for an appropriate number of gripping claws 21, a tread supporting segment 25 is mounted on the gripping claw 21 in an individually rockable fashion. The respective gripping claws 21 are individually coupled via links 28 to a disc 27 associated with a brake disc 26 in the illustrated manner, and the brake disc 26 is opposed to a friction plate 29. When the gripping claws 21 are moved by the cylinders 23, the friction plate 29 is separated from the brake disc 26 as shown in FIG. 14, but when it has been detected that the gripping claws 21 has come to the limit of expansion, the friction plate 29 is urged against the brake disc 26, so that further movement of the gripping claws 21 is prevented via the disc 27 and the links 28.

It is to be noted that the mechanism of the above-described green tire gripping device C can be also employed in the green tire gripping devices in the first, second and third green tire holding and supplying devices D, E and F as will be described later.

In the case where the assembly is used as a green tire gripping device C, the brake means is effective for preventing the gripping claws 21 from being closed by an inertial force of the gripped green tire GT and preventing the green tire GT from being disengaged from the gripping device C when the green tire loading devices $B_1$ and $B_2$ stop at predetermined positions which are limits of entering motion or when they make an emergency stop midway of the entering motion during the period when the green tire loading devices $B_1$ and $B_2$ swing to enter into the press from the positions outside of the press. On the other hand, in the case where the assembly is used as a holding device in a green tire holding and supplying device D, E or F, the holding device is inverted into an upside-down state after it has received a green tire GT as will be described later, and the brake means is effective for preventing the gripping claws 21 from being closed by the weight of the green tire GT.

Figure 1:
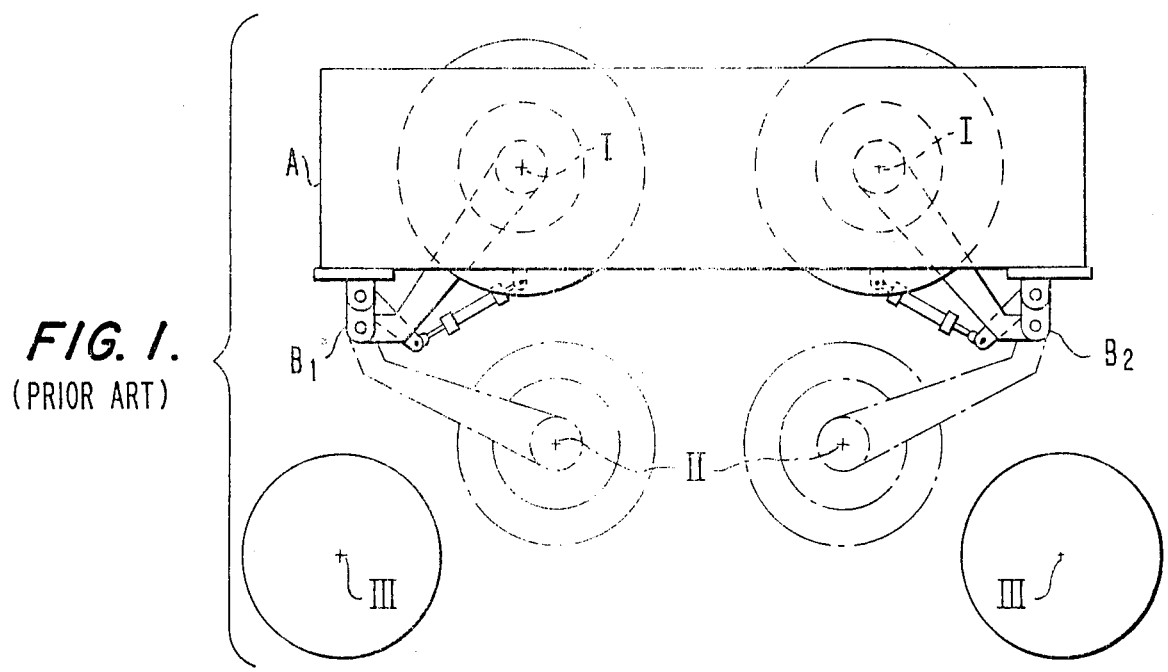
FIG. 1 is a plan view showing a two-chamber type curing press and a green tire loading apparatus therefor in the prior art.
Figure 2:
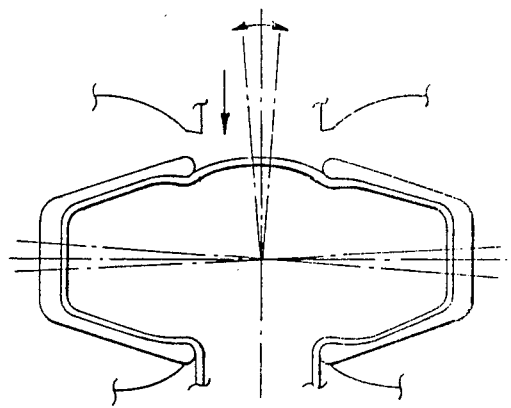
FIGS. 2, 3 and 4 are schematic cross-sectional views showing various states of a green tire loaded into a tire curing press.
Figure 3:
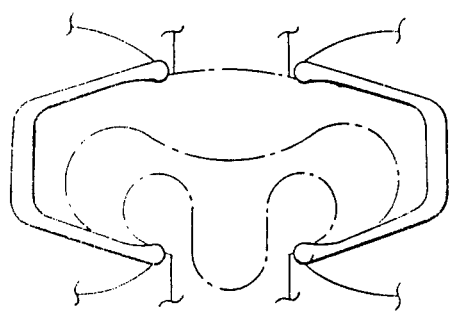
Figure 4:
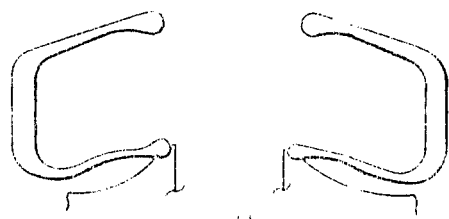

In the case of using the assembly as a green tire gripping device C, the tread support segments 25 are effective for supporting the weight of the tread and for preventing buckling of a green tire as shown in FIG. 4 during the period from the reception of the green tire until the delivery of the green tire to the press, and in the case of using the assembly as a holding device in a green tire holding and supplying device D. E or F, the tread support segments are effective for supporting the weight of the tread to prevent buckling during the period from the reception of a green tire until the supply of the green tire to the green tire gripping device of the green tire loading device, and also for preventing the green tire from becoming disengaged from the gripping claws 21 upon inversion of the holding device.

It is to be noted that in the case where the assembly is used as a holding device in a green tire holding and supplying device D, E or F, the shape of the tip end portion of the gripping claw 21 is formed in a shape that is convenient for suspending the inverted green tire as shown in FIG. 15.

Now, a green tire holding and supplying device D will be described with reference to FIGS. 11 and 12 and FIGS. 16 to 18.

Figure 16:
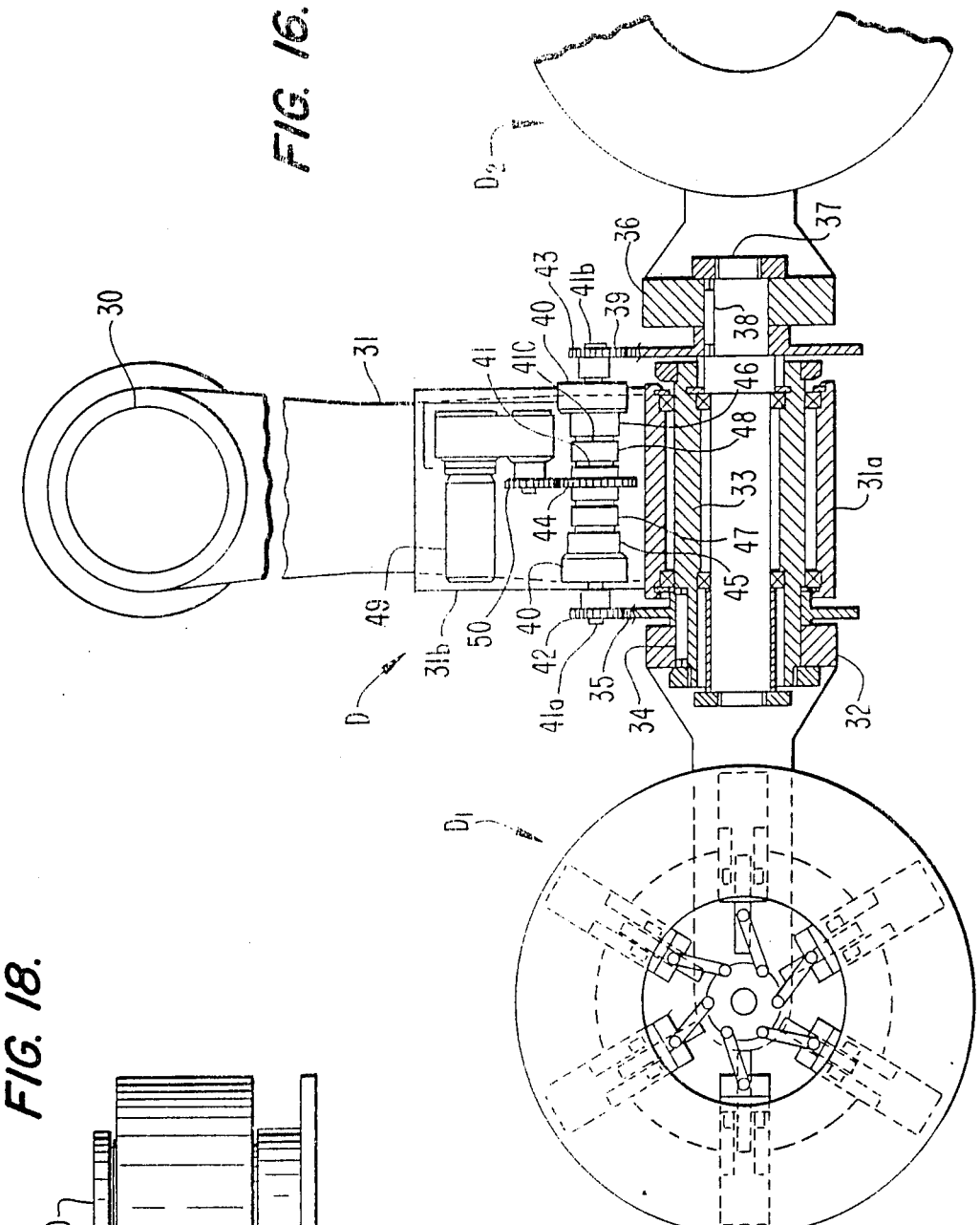
Figure 18:
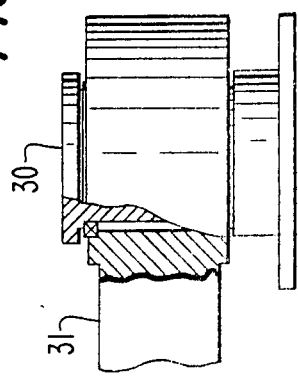
Figure 17:
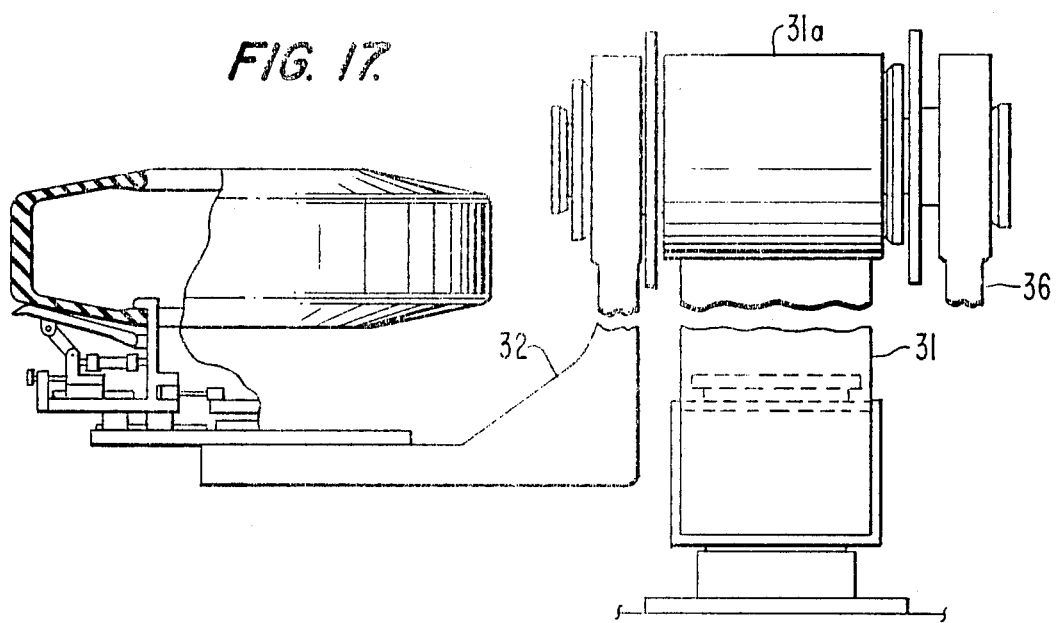

As shown in FIG. 11, a swing rotary shaft 30 is disposed at an appropriate position midway between the respective press centers $I_1$ and $I_2$ of a two-chamber type curing press A and in front of the press. The shaft 30 is fixed mounted on the floor in front of the press, and around this rotary shaft 30 is rotatably mounted an arm 31 by well-known means. The arm is extended. This arm 31 is extended in the forward direction of the press, and its tip end portion has a shape of standing upwardly and is L-shaped as shown in FIG. 12. At the L-shaped tip end portion 31a of the arm 31 are mounted respective green tire holding devices $D_1$ and $D_2$ so as to be freely inverted. A structure for inverting the holding devices is shown in FIG. 16.

An L-shaped first inversion arm 32 is fixedly secured to a hollow first inversion shaft 33 via a key 34, and this inversion shaft 33 is rotatably but axially immovably supported by the tip end portion 31a of the arm 31. A gear 35 is fixedly mounted to the shaft 33 via the key 34.

On the other hand, an L-shaped second inversion arm 36 is fixedly secured to a second inversion shaft 37 via a key 38, and this inversion shaft is rotatably but axially immovably supported by the inner cylindrical surface of the aforementioned inversion shaft 33. A gear 39 is fixedly mounted to the shaft 37 via the key 38.

The pitch circle radii, modules, etc. of the gears 35 and 39 are identical.

A shaft 41 is rotatably supported by brackets 40 fixedly mounted on a base plate 31b that is fixedly provided at an appropriate position of the L-shaped tip end portion 31a, and to the opposite end portions of the shaft 41 are fixedly secured gears 42 and 43 to be meshed with the gears 35 and 39, respectively.

While the shaft 41 is divided into a shaft 41a for the gear 42, a shaft 41b for the gear 43 and a driving shaft 41c, they are aligned axially along one straight line, and to the driving shaft 41c is fixedly secured a gear 44 by well-known means.

To the brackets 40 are mounted respectively electromagnetic brakes 45 and 46, the shafts 41a and 41c are engageable with and disengageable from each other via an electromagnetic clutch 47 and the shafts 41c and 41b are engageable with and disengageable from each other via an electromagnetic clutch 48.

To the gear 44 is meshed a gear 50 fixedly mounted on an output shaft of a rotary driving device 49 which is in turn fixedly provided on the base plate 31b.

It is to be noted that although illustration is omitted, there are provided stoppers for restricting the movements of the arms 32 and 36 at the opposite ends of 180° rotation of the respective inversion arms 32 and 36, and detectors for detecting termination of the rotation.

In addition, to the end portions of the inversion arms 32 and 36 are fixedly secured green tire holding devices $D_1$ and $D_2$, respectively, and as these green tire holding devices, devices similar to that shown in FIG. 14 are mounted. However, as noted previously, the gripping claw portion is modified as shown in FIG. 15. Furthermore, although illustration is omitted, a rod end of a cylinder for rotating the arm 31 about the shaft 30 is coupled to an appropriate position on the arm 31, the other end of the cylinder is coupled to the front surface of the press or to an appropriate position on the floor, and also there are provided stoppers for restricting ends of swing motion of the arm 31 and detectors for detecting termination of the swing motion.

It is a matter of course that wiring and piping for the driving device and detectors of a movable portion are executed through appropriate routes.

According to the above-described structure, the green tire holding devices $D_1$ and $D_2$ are swingable about the shaft 30, also they can be stopped at the opposite ends of the swing motion, as shown in FIG. 11, in addition, at any arbitrary point in the course of swinging, the claws and tread support segments of the green tire holding devices $D_1$ and $D_2$ are individually operable, and further the respective holding devices can be inverted either individually or simultaneously.

With regard to the relation between the green tire loading devices $B_1$ and $B_2$ and the green tire holding and supplying device D, as shown in FIG. 11, if the stop positions of the green tire loading devices $B_1$ and $B_2$ outside of the press are designated by $I_1'$ and $I_2'$, when the green tire holding device $D_1$ is placed at point a, the other green tire holding device $D_2$ is placed at point $a_2'$, which point $a_2'$ coincides with the stop point $I_2'$ outside of the press of the green tire loading device $B_2$, whereas when the green tire holding device $D_2$ is placed at point a, the other green tire holding device $D_1$ is placed at point $a_1'$, which point $a_1'$ coincides with the stop point $I_1'$ outside of the press of the green tire loading device $B_1$.

Now, the operation of the above-described embodiment will be described.

The explanation will be made on the assumption that the state where no green tire is present in front of the curing press A and a curing process is being executed is the start point of the operation.

In addition, although the setting of green tires on the green tire holding devices $D_1$ and $D_2$ could be done by labor of an operator, description will be made on the assumption that it is carried out by means of the automatic delivery and automatic setting device of green tires as disclosed in copending Japanese laid open patent application No. 59-7032 which was filed previously by the Assignee of this invention.

(1) In response to a signal transmitted from the curing press A, an automatic green tire delivery car conveying green tires stops at a position in front of the curing press A. A green tire on the delivery car is brought to a position at point a in front of the press A with the upper bead portion of the green tire suspendingly gripped by an automatic setting device on the delivery car. At this moment, the green tire holding device $D_1$ is placed at point a, while the other green tire holding device $D_2$ is placed at point $a_2'$, and the green tire gripping devices C on the green tire loading devices $B_1$ and $B_2$ are respectively located at the lower limit level at the stop points $I_1'$ and $I_2'$, respectively, outside of the press A.

In this connection, it is a matter of course that the green tire holding devices have such relative heights that they can enter the spaces under the green tire loading devices.

(2) The green tire brought to the point a is lowered by the automatic setting device on the automatic delivery car to a position favorable for the gripping claws of the green tire holding device $D_1$ to grip the green tire, and then the lower bead portion of the green tire is gripped from its inside by the claws of the holding device $D_1$. At the same time, the tread support segments of the holding device $D_1$ support the tread from the below.

In the following a set green tire is called "green tire $GT_1$".

(3) The gripping claws of the automatic setting device are released, then the automatic gripping device rises and rotates to go to receive a new green tire on the delivery car for carrying out the next green tire setting procedure.

(4) At an appropriate time during the rising period of the aforementioned automatic setting device, the green tire holding device $D_1$ is inverted at the point a, and subsequently, the arm 31 rotates to bring the holding device $D_1$ in the inverted state to point $a_1'$, that is, to point $I_1'$. At this moment, the holding device $D_2$ is brought to the position of the point a and is waiting for automatic setting of a green tire to be supplied to the green tire loading device $B_2$. As a matter of course, attention is paid to the configuration of the L-shaped inverting arm 32 such that the lower bead portion of the inverted green tire $GT_1$ may not interfere with the claws of the green tire loading device $B_1$.

(5) When the green tire $GT_1$ is positioned above the green tire gripping device C, the green tire loading device $B_1$ rises a little (then, while the green tire loading device $B_2$ is also raised, no problem would arise because no obstacle is present above the green tire loading device $B_2$), and after it has been brought to a position favorable for gripping the lower bead (the upper bead before inversion) of the suspended green tire $GT_1$, the gripping claws which have been reduced in diameter so far of the green tire gripping device C grip the inside of the bead of the green tire $GT_1$ as being expanded, and at the same time the tread support segments of the green tire gripping device C support the tread portion from the below.

(6) Subsequently, the gripping claws and tread support segments of the green tire holding device $D_1$ are released, and the green tire loading device $B_1$ which has received the green tire $GT_1$ is lowered to its lower limit level. As a result of lowering of the green tire loading device $B_1$, the green tire holding device $D_1$ becomes ready to be moved or inverted.

(7) Before the aforementioned step (6) is finished, after the green tire $GT_1$ was brought to the point $a_1'$ in the step (4) above, the automatic setting device on the delivery car transfers the next green tire to the point a and automatically sets the green tire on the green tire holding device $D_2$ that is in a standby state at the point a, and then the automatic setting device again returns to bring a green tire from the delivery car. The mode of automatic setting of a green tire is similar to the steps (2) and (3) above. The newly set green tire is designated by $GT_2$. The green tire holding device $D_2$ is moved to the point $a_2'$ after it was inverted at the point a.

(8) At this moment, the green tire holding device $D_1$ is returned to the point a while being inverted into its original state.

(9) The green tire $GT_2$ is set on the green tire gripping device C of the green tire loading device $B_2$ through similar procedures to the steps (5) and (6) above. As a result of the above-mentioned operations, the green tires $GT_1$ and $GT_2$ have been gripped by the green tire gripping devices C of the green tire loading devices $B_1$ and $B_2$ one on each gripping device C.

Next, description will be made on the operation until two green tires $GT_1'$ and $GT_2'$ are subsequently held by the green tire holding devices $D_1$ and $D_2$ and four green tires in total have been prepared.

(10) A green tire $GT_1'$ is set on the green tire holding device $D_1$ by means of an automatic setting device through similar procedures to the steps (2) and (3) above, and the green tire holding device $D_1$ is transferred from the point a to the point $a_1'$. In this step, inversion is not effected and the green tire holding device $D_1$ is transferred in the state where it has received the green tire.

(11) After the green tire holding device $D_2$ has moved from the point $a_2'$ to the point a and has stopped there, a green tire $GT_2'$ is set thereon by means of an automatic setting device through similar procedures to the steps (2) and (3) above.

(12) The delivery car is either transferred to another tire curing press to carry out similar procedures or returned to an accumulation storage of green tires to be loaded with green tires.

Through the above-mentioned steps, in front of the tire curing press, four green tires in total, including the green tires $GT_1$ and $GT_2$ on the green tire loading devices $B_1$ and $B_2$, respectively, and the green tires $GT_1'$ and $GT_2'$ on the green tire holding devices $D_1$ and $D_2$, respectively, have been prepared with their lower bead portions and tread portions supported.

It is to be noted that although the green tire holding device $D_1$ holding the green tire $GT_1'$ is positioned under the green tire gripping device C of the green tire loading device $B_1$, since the apparatus is designed such that the green tire $GT_1'$ on the holding device $D_1$ and the gripping device C may not interfere with each other as shown in FIG. 12, no problem would arise.

Next, description will be made on the procedures for transferring the green tires $GT_1'$ and $GT_2'$ on the respective green tire holding devices $D_1$ and $D_2$ to the corresponding green tire gripping devices C of the green tire loading devices $B_1$ and $B_2$, respectively, after the green tires $GT_1$ and $GT_2$ on the green tire loading devices $B_1$ and $B_2$ have been brought into the press, and the procedures for supplementing new green tires onto the respective green tire holding devices.

(13) After completion of a curing process, the press is opened and cured tires are discharged by well-known means. Thereafter, the tire gripping devices C of the respective green tire loading devices $B_1$ and $B_2$ are moved from their standby positions $I_1'$ and $I_2'$ to the centers $I_1$ and $I_2$ of the molds in the press.

It is a matter of course that before the start of the movement, the green tire gripping devices C are adjusted at a level favorable for entering into the press.

(14) After the delivery of the green tires $GT_1$ and $GT_2$ to the press by the intermediary of the green tire loading devices $B_1$ and $B_2$ has been finished through predetermined procedures, the green tire gripping devices C of the green tire loading devices $B_1$ and $B_2$ are returned to a lower limit level at the positions $I_1'$ and $I_2'$ outside of the press.

(15) At this moment, the green tire holding device $D_1$ is holding the green tire $GT_1'$ in its uninverted state under the position $I_1'$. On the other hand, the green tire holding device $D_2$ was inverted at the point a in the step (13) above, and is suspendingly gripping the green tire $GT_2'$.

(16) After the green tire gripping device C of the green tire loading device $B_2$ has been brought to the position $I_2'$, when the green tire $GT_2'$ is brought to the position $a_2'$, that is, the position $I_2'$, the green tire $GT_2'$ is transferred from the holding device $D_2$ to the green tire gripping device C in the manner described previously. On the other hand, the green tire holding device $D_1$ brought to the position a is inverted, and the green tire $GT_1'$ is suspendingly gripped.

(17) After the transfer of the green tire onto the green tire gripping device C of the green tire loading device $B_2$ and completion of the inversion at the point a, the holding device $D_1$ is brought to the point $a_1'$ and the green tire $GT_1$ is transferred to the green tire gripping device C of the green tire loading device $B_1$.

(18) At appropriate times during the aformentioned series of steps, an automatic delivery car called by the tire curing press would set the green tires on the delivery car onto the respective green tire holding devices $D_1$ and $D_2$ by means of an automatic setting device through similar procedures to those described above.

Accordingly, if the green tire loading apparatus is operated through the aforementioned procedures, green tires can be continuously supplemented onto the green tire gripping devices C of the green tire loading devices $B_1$ and $B_2$ and onto the holding devices $D_1$ and $D_2$ of the green tire holding and supplying device D.

Now explanation will be made of still another preferred embodiment of the present invention illustrated in FIGS. 19 through 23.

Figure 19:
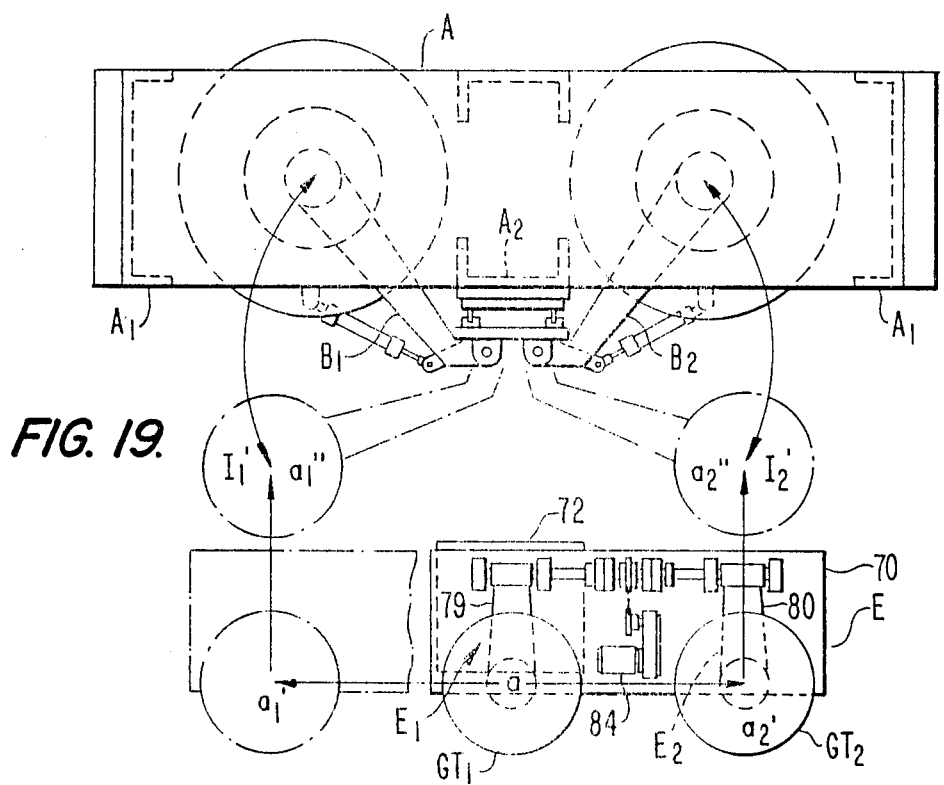
Figure 20:
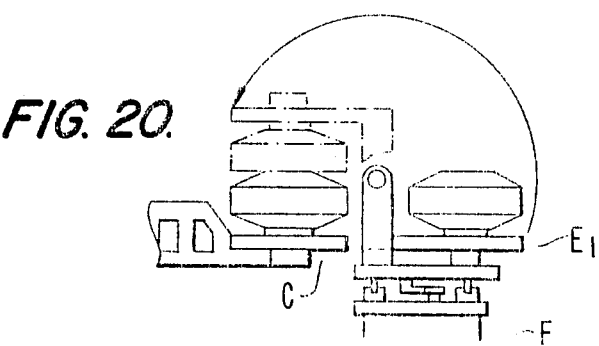
Figure 21:
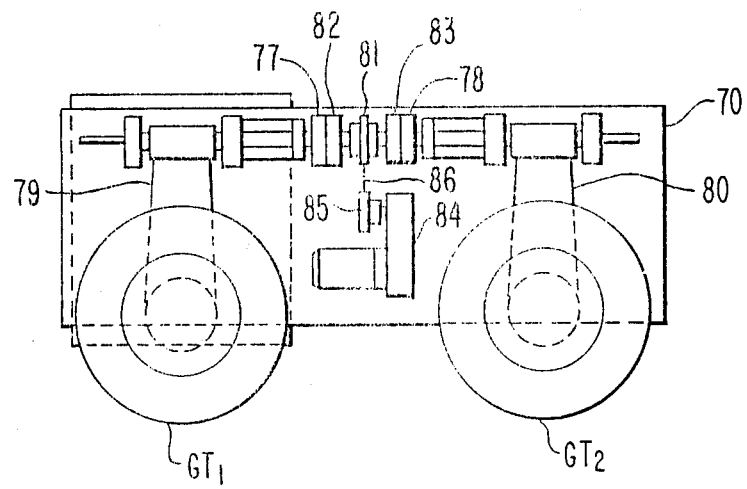
Figure 22:
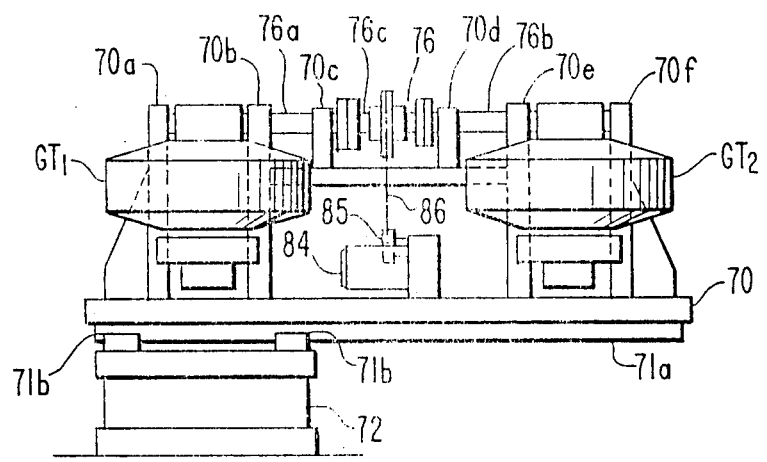
Figure 23:
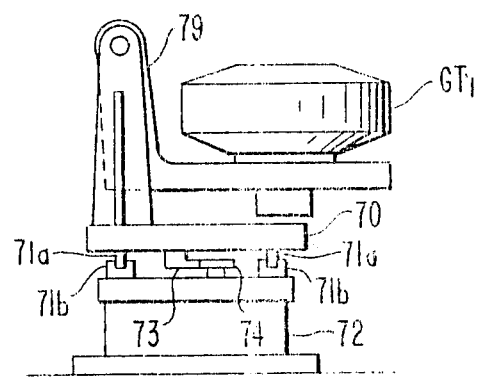

As shown in FIG. 19, a movable truck 70 of a green tire holding and supplying device E is disposed so as to be movable in parallel to a center line $I_1$-$I_2$ connecting the respective centers $I_1$ and $I_2$ of the two chambers of the tire curing press, and on the movable truck 70 are disposed two green tire holding devices $E_1$ $E_2$. On the bottom surface of the movable truck 70 are fixedly provided two tracks 71a of a linear motion device, which tracks are normally called "linear motion bearings", and the tracks 71a are aligned in parallel to the center line $I_1$-$I_2$. Bearing nuts 71b to be engaged with these tracks 71a are fixedly secured to a stand 72 which is in turn fixedly mounted on the floor.

In addition, on the bottom surface of the truck 70 is fixedly mounted a rack gear 73 between the tracks 71a in parallel thereto, a pinion gear 74 to be meshed with this rack gear 73 is mounted to a rotary driving device not shown, and this rotary driving device is fixedly provided at an appropriate position in the stand 72.

On the top surface of the truck 70 are fixedly secured brackets 70a, 70b, 70c, 70d, 70e and 70f, and a shaft 76 is rotatably supported by these brackets.

While the shaft 76 is divided into a shaft 76a fixedly secured to an arm 79 of a green tire holding device $E_1$, a shaft 76b fixedly secured to an arm 80 of a green tire holding device $E_2$ and a driving shaft 76c, these shaft sections 76a, 76b and 76c are aligned axially along one straight line, and to the driving shaft 76c is fixedly secured a chain sprocket 81 by well-known means.

To the bracket 70c is mounted an electromagnetic brake 77, to the bracket 70d is mounted an electromagnetic brake 78, the shafts 76a and 76c are engageable with and disengageable from each other via an electromagnetic clutch 82, and the shafts 76b and 76c are engageable with and disengageable from each other via an electromagnetic clutch 83.

The sprocket 81 is coupled via a chain 86 with another sprocket 85 mounted on an output shaft of a rotary driving device 84 fixedly mounted on the truck 70.

In addition, though illustration is omitted, there are provided stoppers for limiting the movements of the arms 79 and 80 at the opposite ends of rotation by 180° of the respective inverting arms 79 and 80 as well as detectors for detecting completion of the rotation, and also there are provided stoppers for limiting the movement of the movable truck 70 as well as detectors for detecting the limits of the movement.

Also to the arm 79 and 80 are respectively secured green tire holding devices, and for these green tire holding devices, holding devices similar to those shown in FIG. 9 are mounted. However, so noted previously, a portion of the gripping claw is modified as shown in FIG. 15.

According to the above-described structure, the green tire holding devices $E_1$ and $E_2$ can be freely moved or stopped on the stand 72 in parallel to the center line $I_1$-$I_2$ of the press as shown along FIG. 19, and at any arbitrary point in the line of the movement, the respective green tire holding devices $E_1$ and $E_2$ can be inverted either individually or simultaneously.

With regard to the relative positioning between the green tire loading devices $B_1$ and $B_2$ and the green tire holding and supplying device E, as shown in FIG. 19, if the stop positions outside of the press of the green tire gripping devices C of the green tire loading devices $B_1$ and $B_2$ are designated by $I_1'$ and $I_2'$, respectively, when the green tire holding device $E_1$ is placed at point a, the other green tire holding device $E_2$ is placed at point $a_2'$, and this point $a_2'$ is located in front of the stop point $I_2'$ outside of the press of the green tire gripping device C of the green tire loading device $B_2$. When the point $a_2'$ is brought to a point $a_2''$ by inversion of the arm 80, the point $a_2'$ would coincide with the aforementioned stop point $I_2'$.

On the other hand, when the green tire holding device $E_2$ has been brought to the point a, the points $a_1'$ and $a_1''$ corresponding to the position of the green tire holding device $E_1$ before and after its inversion also have similar relations to the stop point $I_1'$ of the green tire loading device $B_1$.

In the preferred embodiment shown in FIGS. 11 to 18 and described previously, the green tire holding devices $D_1$ and $D_2$ were made to swing about the shaft 30 to bring the green tire holding device $D_1$ to the stop point $I_1'$ of the green tire gripping device C of the green tire loading device $B_1$ or to bring the green tire holding device $D_2$ to the stop point $I_2''$ of the green tire gripping device C of the green tire loading device $B_2$, and thereby the green tire supplied from an automatic delivery car was transferred to the respective green tire gripping devices C of the green tire loading devices $B_1$ and $B_2$, whereas in the just described preferred embodiment shown in FIGS. 19 to 23, the only difference therefrom is that the green tire holding devices $E_1$ and $E_2$ are moved in parallel to the center line $I_1$-$I_2$ of the press, and since the operation procedures are substantially identical to the previously described preferred embodiment, further description thereof will be omitted.

Now description will be made on a yet another preferred embodiment of the present invention illustrated in FIGS. 24 to 28.

Figure 24:
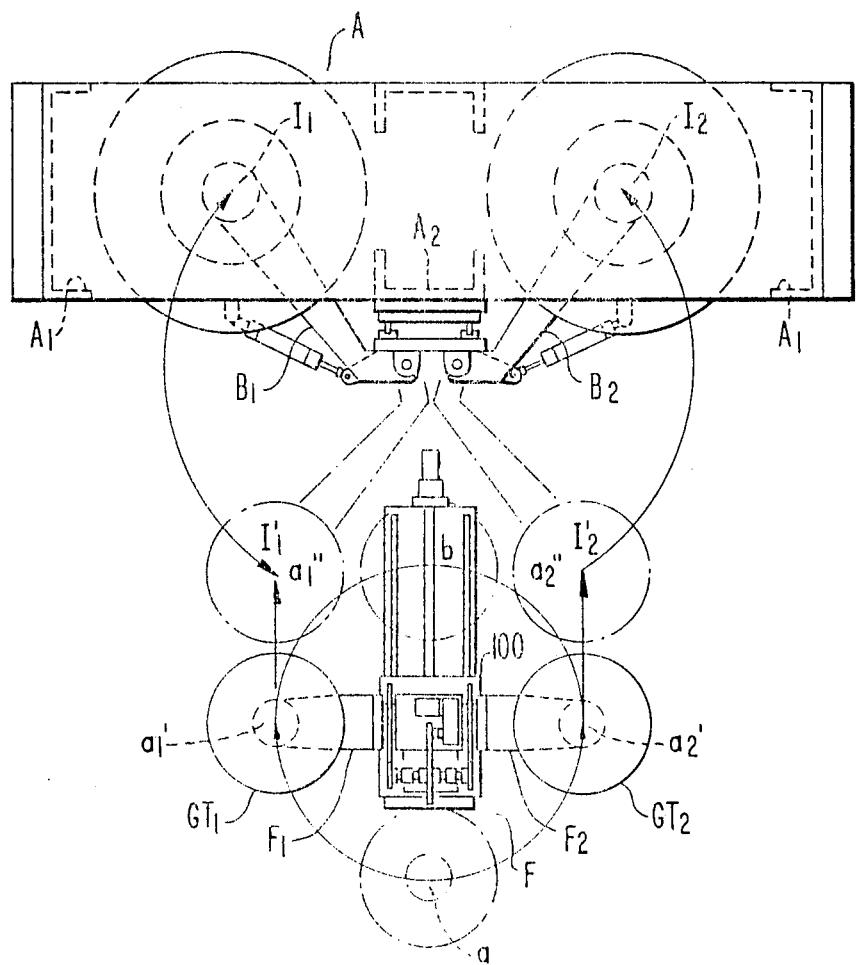
Figure 25:
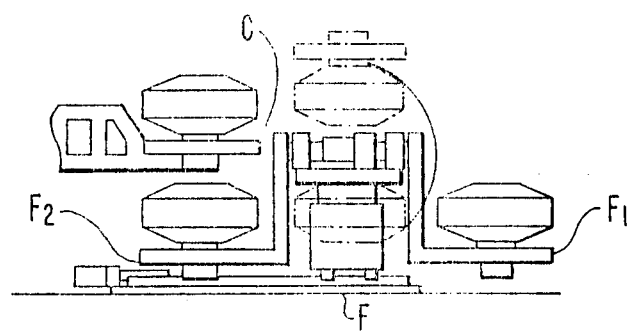
Figure 26:
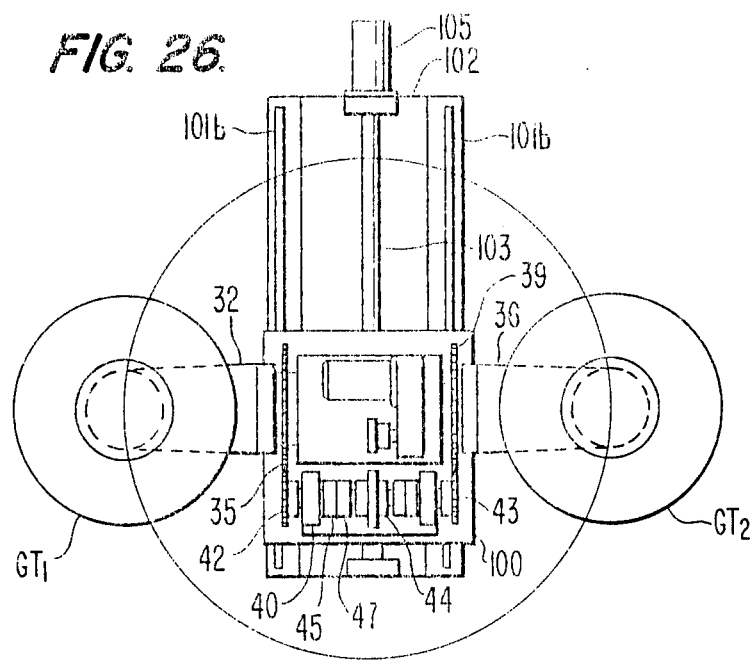
Figure 27:
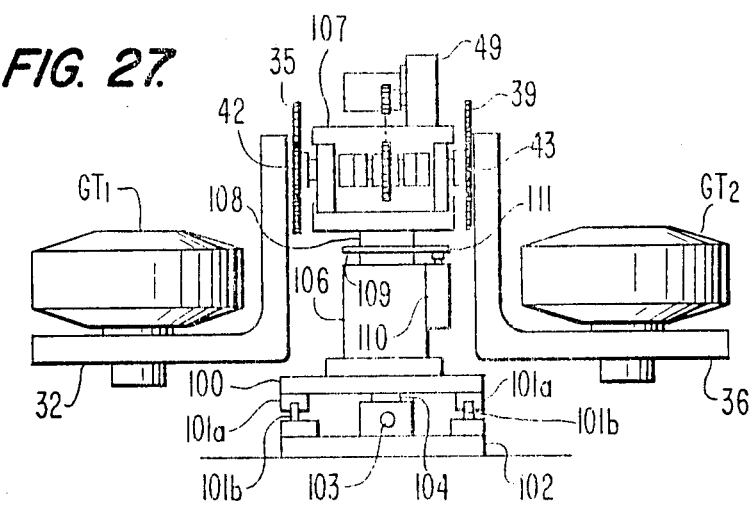
Figure 28:
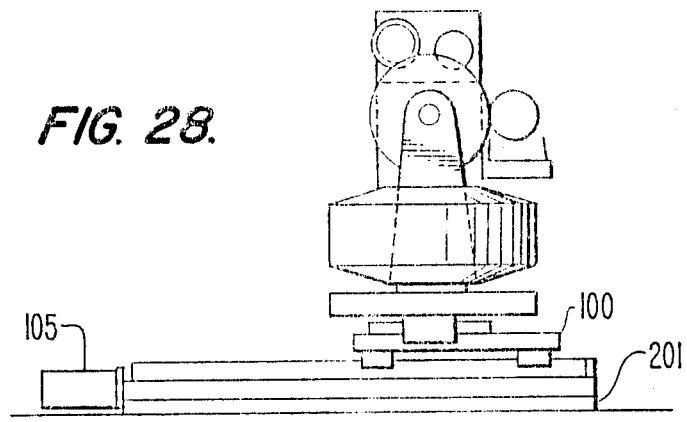

As shown in FIG. 24, a movable truck 100 for a green tire holding and supplying device F is disposed so as to be movable in the direction at right angles to the center lines $I_1$-$I_2$ connecting the centers $I_1$ and $I_2$ of the respective chambers of a press A, two green tire holding devices $F_1$ and $F_2$ are mounted on the truck 100 so that the two green tire holding devices $F_1$ and $F_2$ can be simultaneously rotated about a vertical axis on the movable truck 100 and also the respective green tire holding devices $F_1$ and $F_2$ can be rotated either individually or simultaneously about a horizontal axis on a rotary table of the green tire holding and supplying device F.

To the bottom surface of the movable truck 100 are fixedly secured bearing nuts 101a of a linear motion device which bearing nuts are normally called "linear motion bearings", and tracks 101b to be engaged with the bearing nuts 101a are fixedly mounted on a base frame 102 which is in turn fixedly mounted on the floor. Two tracks 101b are provided, and they are disposed in parallel to each other and at right angles to the center lines $I_1$-$I_2$ of the press A.

In addition, between the tracks 101b is rotatably supported a screw rod 103 from the base frame 102 in parallel to the tracks 101b, and one end of the screw rod 103 is coupled by well-known means to an output shaft of a rotary driving device 105 fixedly mounted on the base frame 102. A nut 104 engaged with the screw rod 103 is fixedly secured to the bottom surface of the truck 100. On the truck 100 is fixedly provided a rotary stand 106, which rotatably supports a shaft 108 projecting downwardly from a rotary table 107. A gear 109 is fixedly mounted at an appropriate position around the shaft 108, and to this gear 109 is meshed a gear 111 fixedly mounted to an output shaft of a rotary driving device 110 which is fixedly provided at an appropriate on the rotary stand 106.

On the rotary table 107 are provided rotary means about a horizontal axis and a driving device therefor, which are similar to those shown in FIG. 6(a)–6(c). It is to be noted that with respect to these portions, since their structure and operation are similiar, the explanation will be omitted by giving like reference numerals to the corresponding component parts.

The center of the rotary shaft 108 and the centers of the respective green tire holding devices $F_1$ and $F_2$ are disposed along one straight line in a plan view, and the center of the rotary shaft 108 is located at the midpoint between the green tire holding devices $F_1$ and $F_2$.

According to the above-described structure, as shown in FIG. 24, the green tire holding devices $F_1$ and $F_2$ can be arbitrarily moved and stopped horizontally on the base frame 102 at right angles to the center lines $I_1$-$I_2$ connecting the centers $I_1$ and $I_2$ of the respective chambers of the press A by means of the driving device 105, and at any arbitrary point in the course of movement they can be arbitrarily rotated and stopped in a horizontal plane by means of the driving device 110.

In addition, the green tire holding devices $F_1$ and $F_2$ can be arbitrarily inverted about a horizontal axis either individually or simultaneously.

With regard to the relative positioning of the green tire loading devices $B_1$ and $B_2$ and the green tire holding and supplying device F, as shown in FIG. 24, if the stop positions of the green tire gripping devices C of the green tire loading devices $B_1$ and $B_2$ outside of the press A are designated by $I_1'$ and $I_2'$, respectively, and the distance between the stop positions $I_1'$ and $I_2'$ is chosen equal to the center distance $a_1'$-$a_2'$ between the respective centers $a_1'$ and $a_2'$ of the green tire holding devices $F_1$ and $F_2$, then when the respective green tire holding devices $F_1$ and $F_2$ has approached the press A with their center line $a_1'$-$a_2'$ kept in parallel to the center lines $I_1$-$I_2$ of the press A as shown in FIG. 24, the respective centers $a_1'$ and $a_2'$ of the green tire holding devices $F_1$ and $F_2$ being newly designated by $a_1''$ and $a_2''$, respectively, these new centers $a_1''$ and $a_2''$ can be made to coincide with the aforementioned centers $I_1'$ and $I_2'$, respectively, of the green tire loading devices $B_1$ and $B_2$.

Now the operation of the above-described preferred embodiment will be described.

The description will be made on the assumption that the state where no green tire is present in front of the curing press A and a curing process is being executed in the curing press A is the starting point of the operation. In addition, although the setting of green tires onto the green tire holding devices $F_1$ and $F_2$ on the green tire holding and supplying device F may be done by the labor of an operator, the description will be made assuming that the setting of green tires is effected by means of a green tire automatic delivery and automatic setting device similarly to the previously described embodiments.

(1) In response to a signal transmitted from the curing press A, a green tire automatic delivery car comes carrying green tires and stops in front of the corresponding curing press A.

A green tire on the delivery car is brought to point a in front of the press A with the upper bead portion of the green tire suspendingly gripped by the automatic setting device on the delivery car. At this moment, the green tire holding device $F_1$ is placed at the point a, while the green tire holding device $F_2$ is placed at point b.

In addition, the green tire gripping devices C of the green tire loading devices $B_1$ and $B_2$ are located at the lower limit level at the stop points $I_1'$ and $I_2'$ outside of the press A of the green tire gripping devices C.

(2) The green tire brought to the point a is delivered from the automatic setting device to the green tire holding device $F_1$. After the delivery, the automatic setting device is returned to bring another green tire on the delivery car.

(3) At an appropriate time, the green tire holding device $F_1$ holding a green tire $GT_1$ is rotated in the clockwise direction by 180° from the point a to the point b, while the green tire holding device $F_2$ is rotated similarly from the point b to the point a.

(4) A new green tire is set on the green tire holding device $F_2$ brought to the point a by means of the automatic setting device. After the setting, the automatic setting device is returned to bring the next tire.

(5) At an appropriate time, the green tire holding devices $F_1$ and $F_2$ respectively holding green tires $GT_1$ and $GT_2$ are rotated in the counterclockwise direction by 90° and stopped at the position in parallel to the press A as shown by solid lines in FIG. 24, so that the green tire $GT_1$ is brought to the point $a_1'$ and the green tire $GT_2$ is brought to the point $a_2'$.

(6) The green tire holding devices $F_1$ and $F_2$ are simultaneously inverted, and hence the green tires $GT_1$ and $GT_2$ are made upside-down at the points $a_1'$ and $a_2'$, respectively.

(7) After the inversion, the truck 100 moves towards the press A and then stops. When it is stopped, the point $a_1'$ coincides with the point $a_1''$, that is, the position $I_1'$, and the point $a_2'$ coincides with the point $a_2''$, that is, the position $I_2'$.

(8) The green tire loading devices $B_1$ and $B_2$ rise, and stops when the green tire gripping devices C on the respective green tire loading devices $B_1$ and $B_2$ come to the positions favorable for receiving the green tires. Then the green tires $GT_1$ and $GT_2$ are respectively delivered to the corresponding green tire gripping devices C.

(9) After completion of the delivery, the green tire loading devices $B_1$ and $B_2$ are lowered to their lower limit level.

(10) After the lowering of the green tire loading devices $B_1$ and $B_2$, the truck 100 moves to the position remote from the press A, and hence the green tire holding devices $F_1$ and $F_2$ are again brought to the point $a_1'$ and the point $a_2'$, respectively.

Thereafter, the green tire holding devices $F_1$ and $F_2$ are inverted, and after completion of the inversion they are rotated in the counterclockwise direction by 90°, so that the green tire holding device $F_1$ is transferred from the point $a_1'$ to the point a, while the green tire holding device $F_2$ is transferred from the point $a_2'$ to the point b.

(11) During the above-mentioned operations, a new green tire on the delivery car has been prepared at a position above the point a, so that as soon as the green tire holding device $F_1$ comes to the point a, the automatic setting device descends and it delivers the new green tire onto the green tire holding device $F_1$. After the delivery, the automatic setting device is returned to again bring a green tire.

(12) At an appropriate time, the green tire holding device $F_1$ holding the green tire $GT_1'$ is rotated from the point a to the point b, and the green tire holding device $F_2$ is rotated from the point b to the point a.

(13) A next green tire is set on the green tire holding device $F_2$ placed at the point a.

(14) The delivery case is either moved to another tire curing press to carry out similar steps to those described above or returned to an accumulation storage of green tires to be loaded with green tires.

(15) At an appropriate time, the green tire holding devices $F_1$ and $F_2$ are rotated in the counterclockwise direction by 90°, and so, the state shown in FIG. 24 is realized.

Through the above-mentioned procedures, the green tires $GT_1$ and $GT_2$ are respectively held on the green tire gripping devices C on the green tire loading devices $B_1$ and $B_2$, respectively, while the green tires $GT_1'$ and $GT_2'$ are respectively held on the green tire holding devices $F_1$ and $F_2$ on the green tire holding and supplying device F, and consequently four green tires in total can be prepared in front of the press A.

(16) The tire curing press discharges cured tires, green tire loading devices $B_1$ and $B_2$ then bring the green tires $GT_1$ and $GT_2$ into the press A and deliver them to the press A, and the loading devices are then returned to the positions $I_1'$ and $I_2'$ outside of the press A. During this period, the green tire holding devices $F_1$ and $F_2$ have been inverted.

(17) The truck 100 advances, and the green tires $GT_1'$ and $GT_2'$ on the green tire holding devices $F_1$ and $F_2$ are delivered to the green tire gripping devices C on the green tire loading devices $B_1$ and $B_2$ through the same procedures as those described previously.

Thereafter, through the same sequence of steps, green tires are successively supplemented from the delivery car to the green tire holding devices $F_1$ and $F_2$ on the green tire holding and supplying device F, and the green tires on the green tire holding devices $F_1$ and $F_2$ are successively transferred to the green tire gripping devices C on the green tire loading devices $B_1$ and $B_2$.

According to the above-described various preferred embodiments of the present inventions, the following effects and advantages can be realized:

(1) Since an inversion is not effected on a green tire loading device, movable portions in a green tire loading device are reduced in number, and so the green tire loading device can employ a structure that can easily realize a high precision.

(2) Since the green tire holding and supplying devices (of the embodiments of FIGS. 11–18, 19–23, and 24–28) are of an inverting type, it is favorable for automatic setting of green tires.

(3) Since the green tire holding and supplying devices are movable, a sufficient space can be reserved in the region in front of the press which is necessitated upon replacement of metal molds.

What is claimed is:

1. A curing press apparatus, comprising:
   a curing press having first and second laterally aligned chambers for curing respective green tires therein, and having a center portion therebetween, each chamber being defined by an upper mold having an upper bead ring and a lower mold, at least one of said upper and said lower molds being reciprocally vertically movable with respect to the other to open and close said chambers;
   a green tire loading mechanism mounted to said press in front of said center portion of said press, said loading mechanism including first and second movable green tire loading devices having upwardly directed gripping claws, for respectively loading a first green tire having first and second opposite bead portions from a first standby position in front of said first chamber into said first chamber, and loading a second green tire having third and fourth opposite bead portions from a second standby position in front of said second chamber into said second chamber;
   a green tire placing table which is angularly movable 180° C. about a horizontal axis, located at a center position in front of said center portion of said tire curing press, and having means for supporting the first and second green tires with their respective first and third bead portions down; and
   means for transferring the first green tire from said center position on said table with the first bead portion down to said first standby position on the gripping claws of said first loading device with the second bead portion down, and for transferring the second green tire from said center position on said table with the third bead portion down to said second standby position on the gripping claws of said second loading device with the fourth bead portion down, said transferring means including
      means for moving the first green tire from said center position to said first standby position on one of said table and the gripping claws of said first loading device,
      means for moving the first green tire from said table onto the gripping claws of said first loading device with the second bead portion down,
      means for inverting said table with the first green tire thereon,
      means for moving the second green tire from said center position to said second standby position on one of said table and the gripping claws of said second loading device,
      means for moving the second green tire from said tire onto the gripping claws of said second loading device with the fourth bead portion down and
      means for inverting said table with the second green tire thereon.

2. A curing press apparatus, comprising:
   a curing press having first and second laterally aligned chambers for curing respective green tires therein, and having a center portion therebetween;
   a movable member vertically movably mounted to said press and having at least a part thereof in front of said center portion of said press; and
   first and second arms, vertically movable with said movable member, and having first ends pivotally mounted to said movable member in front of said center portion, said first and second arms having first and second green tire gripping devices mounted at respective free second ends of said first and second arms opposite said first ends, said first and second green tire gripping devices having means for releasably carrying respective green tires therewith;
   said first arm being horizontally reciprocally pivotable in a first angular segment about said center portion between a first green tire receiving position in which said first gripping device is in front of said curing press and a first green tire loading position in which said first gripping device is over said first chamber, and said second arm being horizontally reciprocally pivotable in a second angular segment about said center portion nonoverlapping said first angular segment, between a second green tire receiving position in which said second gripping device is in front of said curing press and a second green tire loading position in which said second gripping device is over said second chamber.

3. A curing press apparatus as in claim 2, further comprising
   a base plate fixed to said press, said movable member being verically movably mounted on said base plate, said base plate having an upper end and an lower end below said upper end, said base plate being pivotally supported by said press at one of said upper end and said lower end, said press having means for supporting the other of said upper end and said lower end such that said other end if freely vertically expandable and contractable.

4. A curing press apparatus as in claim 3, further comprising vertically extending first and second rods have square cross sections respectively slidably engaging first ends of said first and second arms such that rotation of said first and second rods above vertical axes thereof horizontally pivots said first and second arms in said first and second angular segments.

5. A curing press apparatus as in claim 2, further comprising vertically extending first and second rods have square cross sections respectively slidably engaging first ends of said first and second arms such that rotation of said first and second rods above vertical axes thereof horizontally pivots said first and second arms in said first and second angular segments.

6. A curing press apparatus as in claim 5, further comprising means for rotating said first and second rods about said vertical axes, said rotating means including cylinders mounted to said press at said center portion and cylinder arms connecting said cylinders to said first and second arms.

7. A curing press apparatus as in claim 4, further comprising means for rotating said first and second rods about said vertical axes, said rotating means including cylinders mounted to said press at said center portion and cylinder arms connecting said cylinders to said first and second arms.

8. A curing press apparatus, comprising:
a curing press having first and second laterally aligned chambers for curing respective green tires therein, and having a center portion therebetween;
a movable member vertically movably mounted to said press and having at least a part thereof in front of said center portion of said press;
first and second arms, vertically movable with said movable member, and having first ends pivotally mounted to said movable member in front of said center portion, said first and second arms having first and second green tire gripping devices mounted at respective free second ends of said first and second arms opposite said first ends, said first and second green tire gripping devices having means for releasably carrying respective green tires therewith; said first arm being horizontally reciprocally pivotable in a first angular segment about said center portion between a first green tire receiving position in which said first gripping device is in front of said curing press and a first green tire loading position in which said first gripping device is over said first chamber, and said second arm being horizontally reciprocally pivotable in a second angular segment about said center portion nonoverlapping said first angular segment, between a second green tire receiving position in which said second gripping device is in front of said curing press and a second green tire loading position in which said second gripping device is over said second chamber; and
a green tire placing table having first and second set pedestals for supporting respective first and second green tires and transferring said first and second green tires to said first and second green tire gripping devices, said first and second set pedestals being alternatingly reciprocally movable between a green tire supply position in front of said center portion of said press and at least one other position.

9. A curing press apparatus as in claim 8, wherein said first and second set pedestals are movable between said green tire supply position for receiving thereat the first and second green tires, and respectively first and second loading standby positions in front of said first and second chambers for respectively transferring thereat the first and second green tires to said first and second green tire gripping devices.

10. A curing press apparatus as in claim 8, wherein said placing table includes a straight table arm connecting said first and second set pedestals and means for rotatable supporting said table arm for rotation about a vertical axis in front of said center portion of said press.

11. A curing press apparatus as in claim 8, wherein said placing table includes a forked table arm having said first and second set pedestals at free end portions thereof, and means for pivoting said forked table arm about a vertical axis.

12. A curing press apparatus as in claim 9, wherein said table is reciprocable in a linear direction between said first and second loading standby positions.

13. A curing press apparatus, comprising:
a curing press having first and second laterally aligned chambers for curing respective green tires therein, and having a center portion therebetween;
a movable member vertically movably mounted to said press and having at least a part thereof in front of said center portion of said press;
first and second arms, vertically movable with said movable member, and having first ends pivotally mounted to said movable member in front of said center portion, said first and second arms having first and second green tire gripping devices mounted at respective free second ends of said first and second arms opposite said first ends, said first and second green tire gripping devices having means for releasably gripping a lower bead of respective green tires and carrying the green tires therewith; said first arm being horizontally reciprocally pivotable in a first angular segment about said center portion between a first green tire receiving position in which said first gripping device is in front of said curing press and a first green tire loading position in which said first gripping device is over said first chamber, and said second arm being horizontally reciprocally pivotable in a second angular segment about said center portion nonoverlapping said first angular segment, between a second green tire receiving position in which said second gripping device is in front of said curing press and a second green tire loading position in which said second gripping device is over said second chamber; and
a green tire supply table having means for receiving the first and second green tires thereon so as to support lower bead portions thereof and means for inverting said table so as to invert a green tire thereon and transfer the inverted green tire onto one of said first and second gripping devices so as to have a lower bead portion thereof gripped thereby.

14. A curing press apparatus as in claim 13, wherein said green tire supply table is invertable 180 degrees about a horizontal axis.

15. A curing press apparatus as in claim 13, wherein said green tire supply table is movable between a position for receiving a green tire and respective first and second loading standby positions respectively in front of said first and second chambers, said table being respectively invertable at said first and second loading standby positions to invert and transfer a green tire thereon onto said first and second gripping devices.

* * * * *